United States Patent
Surmi et al.

(10) Patent No.: US 10,355,853 B1
(45) Date of Patent: *Jul. 16, 2019

(54) MULTILAYERED OBSTRUCTED BROKERED (MOB) EMBEDDED CYBER SECURITY ARCHITECTURE

(71) Applicant: The United States of America as Represented by the Secretary of the Navy, Washington, DC (US)

(72) Inventors: Jonathan L. Surmi, Ridgecrest, CA (US); Alvin L. Quintana, Ridgecrest, CA (US); Mark Miliano, Ridgecrest, CA (US); Anthony R. Kunkel, Ridgecrest, CA (US)

(73) Assignee: The United States of America as Represented by the Secretary of the Navy, Washington, DC (US)

(*) Notice: Subject to any disclaimer, the term of this patent is extended or adjusted under 35 U.S.C. 154(b) by 576 days.

This patent is subject to a terminal disclaimer.

(21) Appl. No.: 14/998,845

(22) Filed: Aug. 25, 2016

(51) Int. Cl.
*H04L 9/00* (2006.01)

(52) U.S. Cl.
CPC .................... *H04L 9/00* (2013.01)

(58) Field of Classification Search
CPC ........................................................ H04L 9/00
See application file for complete search history.

(56) References Cited

U.S. PATENT DOCUMENTS

| 8,234,068 B1* | 7/2012 | Young | G01C 21/00 244/175 |
| 9,630,713 B1* | 4/2017 | Von Novak, Iii | B64C 25/52 |
| 2008/0077616 A1* | 3/2008 | Davidson | G05D 1/0077 |
| 2008/0208396 A1* | 8/2008 | Cairola | G06F 3/011 701/3 |
| 2012/0141066 A1* | 6/2012 | Tournier | G02B 6/4246 385/24 |
| 2013/0021475 A1* | 1/2013 | Canant | H04N 5/33 348/144 |
| 2013/0298228 A1* | 11/2013 | Smith | H04L 63/0414 726/22 |
| 2014/0142785 A1* | 5/2014 | Fuentes | G05D 1/0011 701/2 |
| 2016/0026530 A1* | 1/2016 | Krishnamurthy | H04L 67/1097 714/18 |
| 2016/0232794 A1* | 8/2016 | Hafeez | G08G 5/0034 |
| 2018/0290748 A1* | 10/2018 | Corban | B64C 39/024 |

OTHER PUBLICATIONS

Alena et al.; Communications for Integrated Modular Avionics; Published in: 2007 IEEE Aerospace Conference; Date of Conference : Mar. 3-10, 2007; IEEE Xplore (Year: 2007).*

Perry; The application of commercial processing technologies to the airborne military environment; Published in: 17th DASC. AIAA/IEEE/SAE. Digital Avionics Systems Conference. Proceedings (Cat. No. 98CH36267); Date of Conference: Oct. 31-Nov. 7, 1998; IEEE Xplore (Year: 1998).*

* cited by examiner

*Primary Examiner* — Bradley W Holder
(74) *Attorney, Agent, or Firm* — James M. Saunders

(57) ABSTRACT

Embodiments of the invention are directed to a multilayered obstructed brokered network routing and data repackaging system, sometimes referred to as a MOB HUB. The MOB HUB is configured to communicate with a mission computer on a vehicle. At least one mobile computer is configured to communicate with the MOB HUB.

8 Claims, 22 Drawing Sheets

MULTILAYERED OBSTRUCTED BROKERED (MOB) EMBEDDED CYBER SECURITY ARCHITECTURE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to cyber security and, more particularly, to using brokered interfaces to reduce attack surfaces.

Figure 1:
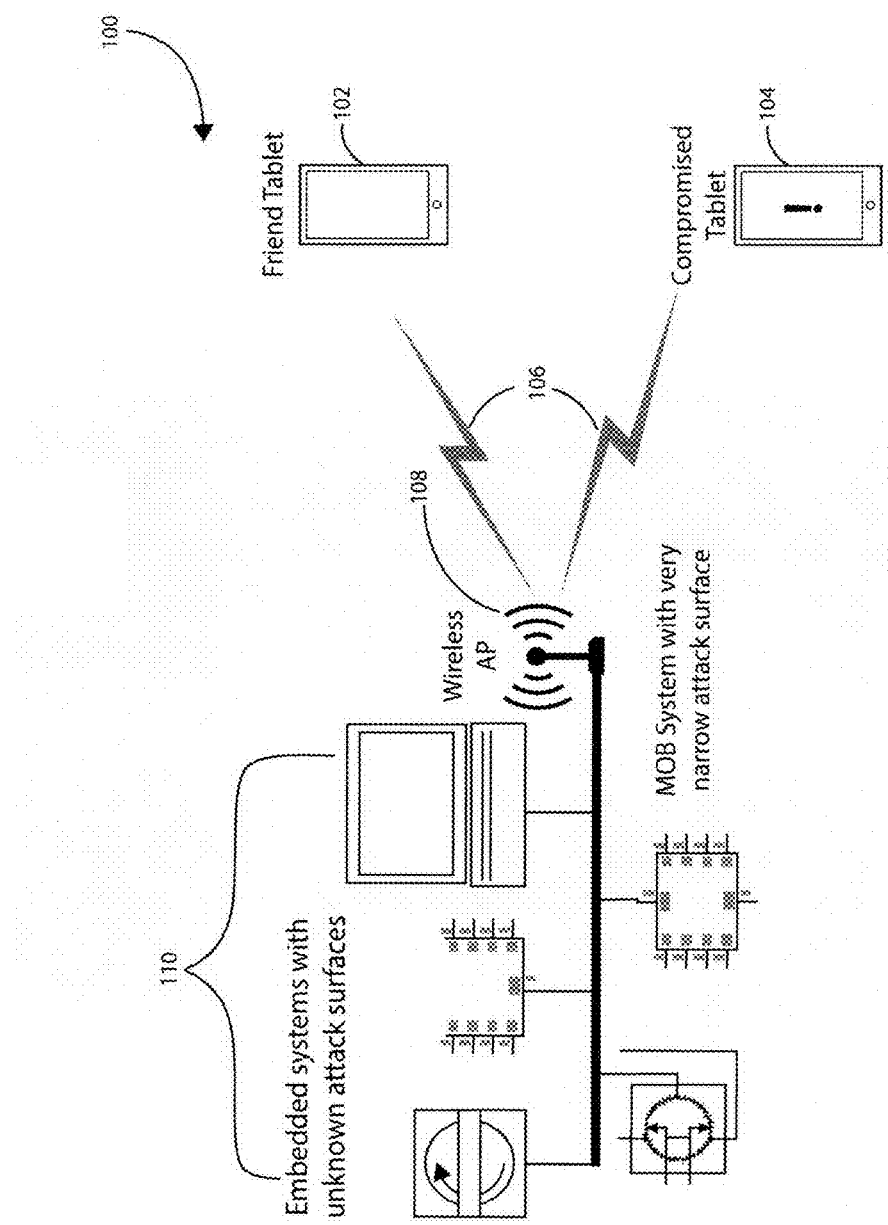
FIG. 1 illustrates isolation of embedded systems, according to some embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

Embodiments of the invention are directed to cyber security architecture for embedded computer systems. Current embedded system protection techniques include patching the systems, sometimes referred to in the art as "protect and patch," to reduce their attack surfaces. The protect and patch technique, in addition to the significant financial costs, leaves parts of the embedded systems accessible to wider networks, thereby still offering direct attack surfaces. Embodiments of the invention solve the problem by introducing a new paradigm of thinking in relation to an embedded system's ability to touch the wider network. The approach uses limited processing and communication capability components which intentionally obstruct direct communication paths and, hence, attack surface paths from the wider network to the embedded systems. In addition to being more cost effective, embodiments of the invention significantly reduce attack surfaces in legacy embedded systems.

Embodiments of the invention isolate and obstruct the embedded asset from the clients (mobile tablets) that wish to communicate with the asset. In order to ensure the CIA of the data that is being sent wirelessly, an encryption module can be integrated into the system. Embodiments of the invention ensure the Confidentiality, Integrity, and Availability (CIA) of data transmitted. The MOB hub and cyber kneeboard each have their own dedicated encryption/decryption module. Once a Cyber Kneeboard is paired with the encryption/decryption module of a MOB hub system, the data on the wireless link is now completely secure from both ends.

Although embodiments of the invention are described in considerable detail, including references to certain versions thereof, other versions are possible. Examples of other versions include performing the tasks in an alternate sequence or hosting embodiments on different platforms. Therefore, the spirit and scope of the appended claims should not be limited to the description of versions included herein.

At the outset, it is helpful to describe various conventions, definitions, and parameters associated with embodiments of the invention.

Communication Standards

MIL-STD-1553: MIL-STD-1553 is a military standard published by the United States Department of Defense (DoD) that defines the mechanical, electrical, and functional characteristics of a serial data bus. A MIL-STD-1553 multiplex data bus system consists of a Bus Controller (BC)

controlling multiple Remote Terminals (RT) all connected together by a data bus providing a single data path between the bus controller and all the associated remote terminals.

IEEE 802.11: IEEE 802.11 is the acronym for the Institute of Electrical and Electronic Engineers set of media access control (MAC) and physical layer (PHY) specifications for implementing wireless local area network (WLAN) computer communication in the 2.4, 3.6, 5 and 60 GHz frequency bands. The Wi-Fi Alliance defines Wi-Fi as any WLAN products that are based on IEEE 802.11 standards. Only Wi-Fi products that complete Wi-Fi Alliance interoperability certification testing successfully may use the "Wi-Fi CERTIFIED" trademark.

Network Interface: A network interface is the point of interconnection between a computer and a private or public network. A network interface is generally a network interface card (NIC), but does not have to have a physical form. Instead, the network interface can be implemented in software. Network interfaces provide standardized functions such as, for example, passing messages, connecting and disconnecting.

Transmission Control Protocol (TCP): TCP is a core protocol of the Internet protocol suite. It originated in the initial network implementation in which it complemented the Internet Protocol (IP). Therefore, the entire suite is commonly referred to as TCP/IP. TCP provides reliable, ordered, and error-checked delivery of a stream of octets between applications running on hosts communicating over an IP network. TCP is the protocol that major Internet applications such as the World Wide Web, email, remote administration and file transfer rely on. Applications that do not require reliable data stream service may use the User Datagram Protocol (UDP), which provides a connectionless datagram service that emphasizes reduced latency over reliability.

Serial Peripheral Interface (SPI): SPI is an interface that enables the serial (one bit at a time) exchange of data between two devices, one called a master and the other called a slave. An SPI operates in full duplex mode. This means that data can be transferred in both directions at the same time.

Cyber Security Terminology

Confidentiality, Integrity, and Availability, or CIA triad: CIA is a cyber-security model to improve information security within an organization or networked system. In this context, confidentiality is a set of rules that limits access to information, integrity is the assurance that the information is trustworthy and accurate, and availability is a guarantee of reliable access to the information by authorized people.

Vulnerability: In information technology (IT), vulnerability is a flaw in code or design that creates a potential point of security compromise for an endpoint or network. Vulnerability is the intersection of three elements: a system susceptibility or flaw, attacker access to the flaw, and attacker capability to exploit the flaw.

Attack vector (threat vector): An attack vector (threat vector) is a path or means by which a hacker (or cracker) can gain access to a computer or network server in order to deliver a payload or malicious outcome. Attack vectors enable hackers to exploit system vulnerabilities, including the human element.

Attack surface: An attack surface is the total sum of the vulnerabilities in a given computing device or network that are accessible to a hacker. For the purposes of embodiments of the invention, a narrow attack surface describes a system having very few realizable attack vectors. The attack vectors that are realizable would require physical access to the target system and a significant amount of time to reverse engineer the system interfaces. A wide attack surface is when a system has one or more realizable attack vectors that do not require much time or physical access to employ.

Non-repudiation: Non-repudiation, with regards to digital security, is a service that provides proof of the integrity and origin of data. It is an authentication that can be asserted to be genuine with high assurance.

Penetration testing: Penetration testing, sometimes called pen testing for short, is the practice of testing a computer system, network, or Web application to find vulnerabilities that an attacker could exploit.

Protect & patch: Protect & patch is a term meaning to first protect critical information by putting up firewalls and implementing other security infrastructure around the data to be protected. Afterwards, a patching system is employed that ensures all software and hardware on the network is kept up to date with any new antimalware signatures or patches.

Human factor: The human factor is the study of how humans behave physically and psychologically in relation to particular environments or communication techniques. Specifically, from a cyber perspective, the human factor terminology is used to describe how humans are prone to exploitation when it comes to an attacker's methods of manipulation to gain access to an otherwise secure network.

Software Framework: In computer programming, a software framework is an abstraction in which software providing generic functionality can be selectively changed by additional user-written code, thus providing application-specific software.

Embedded Systems

Embedded operating systems: Embedded operating systems (OS) are specialized operating systems built into larger systems or computers. In contrast to an operating system for a general-purpose computer, an embedded operating system is typically quite limited in terms of function—depending on the device in question, the system may only run a single application. However, that single application is crucial to the device's operation, so an embedded OS must be reliable and able to run with constraints on memory, size and processing power. This is in contrast to firmware which is permanent software programmed into the read-only memory of an embedded computing system.

Capable Processor: The term capable processor is used herein to describe a processor that is running a high level operating system (HLOS) to control peripherals, manage a file system, run various software programs, and execute a schedule of events, processes, and services. A capable processor utilizes an advanced operating system like Windows 7 (developed by Microsoft, Corp.), Linux (developed by Linus Torwalds), or Android (currently developed by Google, Inc.), for example. Because of the many features and functions of an HLOS (and associated vulnerabilities), the attack surface is considered to be high. An HLOS can be integrated onto a processor in an embedded system. Usually an embedded HLOS will be a stripped down to only the core functions that are desired.

Limited processor: The term limited processor is used herein to describe a processor that is not running an operating system at all. Rather, the processor is executing a permanent software application (firmware) that has been programmed into the read-only memory of an embedded computing system like a microcontroller. There is no file system. Only direct execution of micro-code at the register transfer level. Because of the very limited functionality of this kind of processor, the attack surface is very low.

Microcontroller: A microcontroller (MCU) is single chip having the processor (the CPU), non-volatile memory for the program (ROM or flash), volatile memory for input and output (RAM), a clock and an I/O control unit.

Encryption

NSA Type 1: NSA Type 1 is a National Security Agency (NSA) certified device/system used to handle classified data.

Suite A/Suite B: Suites A and B are NSA-certified algorithms used to classify an application. Suite A denotes a device is used in U.S. only applications and can be used for Secret, Top Secret, or Sensitive Compartmented Information applications. Suite B denotes device is used in U.S. and Coalition Forces application and can be used for Secret applications.

NSA Type 2: NSA Type 2 product is directed to unclassified cryptographic equipment, assemblies, or components, endorsed by NSA, for use in telecommunications and automated information systems for the protection of national security information.

Tactical Implementation

Hub: The term hub is most often understood in the context of a simple computer routing system. However, as used in describing embodiments of the invention, the term hub is used to describe a sophisticated, self-contained, network routing, and data repackaging scheme that can smartly translate and route between different communication protocols and communicating parties. Thus, the use of the term hub herein is different than a network hub that simply functions as a common connection point for computing devices.

Apparatus Embodiments

Embodiments of the invention enhance an operator's ability to interact wireless with various embedded systems on the aircraft MIL-STD-1553 data bus. Embodiments of the invention are a multilayered obstructed brokered (MOB) embedded cyber security architecture (MOB Architecture) that introduces techniques to secure the transfer of data between embedded systems and mobile computing systems, specifically mobile tablets. Enabling tablet integration with the aircraft or other vehicle mission computer is only one of many benefits that enhance future military capabilities. The disclosed embodiments describe the MOB architecture and Cyber Kneeboard embedded systems and mobile tablet integration via wireless communication. Additionally, it should be noted that while some embodiments mention aircraft embedded systems, and more particularly, the F/A-18 and E/A 18G, embodiments are applicable to all aircraft, both fixed-wing and rotary-wing. Furthermore, embodiments of the invention are equally applicable to other vehicles such as, for example, spacecraft, land vehicles, sea vessels, submarines, and littoral zone vehicles, without detracting from the merits or generality of embodiments of the invention.

The traditional definition of embedded cyber security is the reduction of vulnerabilities and protection against threats in software or firmware running on embedded devices. The fact is that if the embedded system is to have direct contact with a wider network, any vulnerability now becomes the target of exploitation. Therefore, the embedded system becomes more secure as each known vulnerability is mitigated.

In the accompanying drawings, like reference numbers indicate like elements. FIG. 1 illustrates isolation of embedded systems, according to some embodiments of the invention and is shown with reference character 100. FIG. 1 is illustrative because it depicts an objective of the MOB architecture, which is to allow many vulnerable embedded systems to live behind a single MOB system that brokers and obstructs communication between the vulnerable embedded systems and clients on the wider network. Clients, depicted as a friend tablet and compromised tablet, reference characters 102 and 104, respectively, can never actually touch an embedded system 110 from a connectivity standpoint. Instead, the clients 102 & 104 communicate (shown by reference character 106) with a MOB network 108, and must rely on the MOB network 108 of both limited and capable processors to broker agreements amongst themselves in order to pass along a client message to the embedded system 110 and vice versa. In the end, the vulnerable embedded system 110 never touches the wider network (the clients 102 & 104). However, through the MOB network 108, data is still transported between parties, and the isolation, and therefore security, of the embedded asset 110 is preserved.

Figure 2:
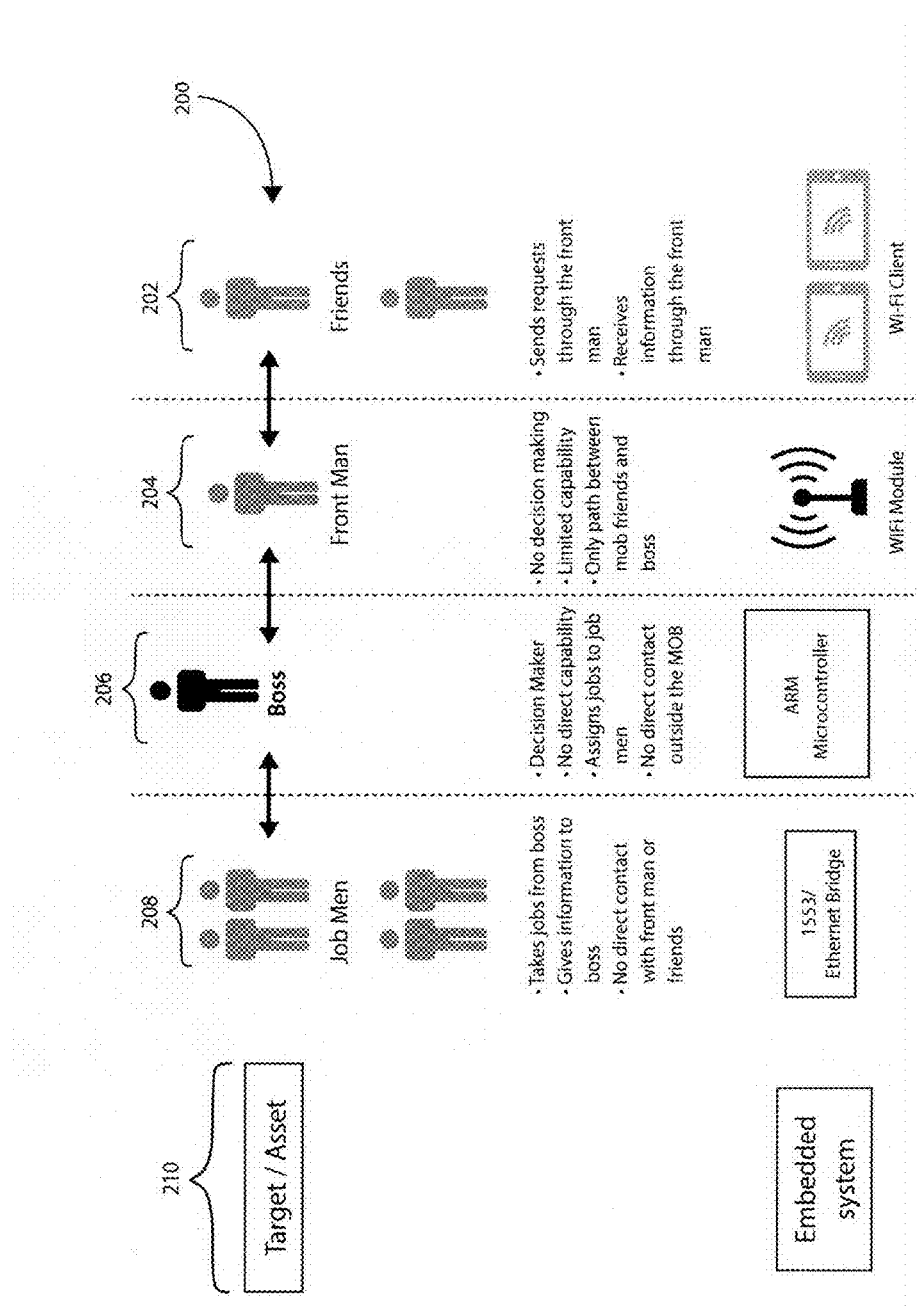
FIG. 2 illustrates a rendering of a multilayered obstructed brokered architecture, according to some embodiments of the invention.

FIG. 2 is an educational tool that illustrates a rendering of a multilayered obstructed brokered (MOB) architecture of an embedded system with that of an invented criminal organization network to illustrate concepts inherent in embodiments of the invention. Reference character 200 is generically used for the MOB architecture, which may also be referred to as a network. The MOB architecture 200 is a multilayered network of both limited and capable processors that obstruct and broker communication between two nodes in a communication channel.

In this example, the Boss 206 is the primary decision maker. He has no direct contact with the Friends 202 in the outside world, or with the target/asset 210. However, the Boss 206 can have indirect contact via his Front Man 204 and Job Men 208 associates. In both cases, the Front Man 204 and the Job Men 208 are not decision makers. Thus, the Front Man 204 and Job Men 208 have very limited job descriptions that restrict their ability to do anything outside of the narrow capacity defined by their role.

From a security standpoint, this makes it very difficult for a compromised Friend (one of 202) to gain access to the target/asset 210 without somehow expanding the limited capabilities of the Front Man 204 and Job Men 208. In the criminal world, there are ways to socially engineer the Front Man 204 or Job Men 208 because of the human factor. From a technical standpoint, however, the concept of a multilayered network of both limited and capable processors has a unique advantage. Namely, the limited processors (Front Man 204 and Job Men 208) have permanent software programmed into their read-only memory. If this firmware is designed to be extremely narrow in capability, then it becomes very difficult for an attacker to directly exploit these limited systems without actually gaining physical access to the hardware and re-programming the processors.

Assuming, for example, that the Front Man 204 has somehow been compromised, this does not mean a rogue Friend (one of 202) can have any direct communication with the Boss 206 or the target/asset 210. It is the compromised Front Man 204 that must somehow convince the Boss 206 that he is in fact the real Front Man. The challenge is that the MOB Architecture 200 requires the communication interface between the Front Man 204 and the Boss 206 to have already been brokered in advance. This means that the Boss 206 maintains a complete set of everything the Front Man 204 is allowed to communicate over the interface. This brokered interface makes it improbable for a compromised Front Man 204 to communicate anything outside the interface controls maintained by the Boss 206.

In order for a compromised Front Man 204 to communicate an attack to the Boss 206, an attacker is forced to re-program the interface controls on both ends of the brokered interface between the Front Man and the Boss. In the case of the Front Man 204, an attacker must also gain physical access to the Boss 206 and update the communication interface description to include allowances for the desired attack vector.

Thus, the above description shows two important concepts:

(1) First, by placing a very limited processor 204 with a very narrow attack surface in-between the clients 202 and the capable processor 206, an attacker is limited to a small subset of attack vectors with which to engage the limited processor before the attacker can reach the capable processor.

(2) Second, by creating a brokered interface between the capable processor 206 and the limited processor 204, the attack surface of the capable processor is extremely reduced because both processors are forced to maintain a complete set of everything that is allowed to communicate over the interface.

To even further reduce the attack surface of the capable processor (Boss) 206, the communication can be obstructed by introducing the use of a limited or primitive network interface between the Boss and the Front Man 204. In the example of the criminal network 200, a limited or primitive communication interface might be the use of the postal system for certain types of critical communication as opposed to email. Email communications might greatly improve efficiency and speed. However, it is far easier for electronic communications to be monitored and exploited.

In the same way, when the limited processor (Front Man 204) communicates over the brokered interface to the capable processor (Boss 206), a limited network interface will be utilized. A limited network interface might be an implementation of TCP that only executes core functions required for basic communication. Also, SPI is a primitive communication protocol that offers a very narrow attack surface for attackers because of its extremely limited use in networking infrastructure. In short, a third important concept can be concluded:

(3) By employing a limited or primitive, physical communication standard between the limited processor 204 and the capable processor 206, the attack surface of the capable processor is further reduced.

Based on the above, the MOB Architecture 200 has been described from the perspective of how it almost completely reduces the attack surface of the capable processor 206 from an external network. However, assuming that an attacker has physical access to the capable processor (Boss 206), and physical access to the limited processor (Front Man 204), determining the attack surface of the asset/target 210 becomes important.

The asset/target 210 does not have direct communication with the capable processor (Boss 206). Rather, the asset/target 210 must be linked to limited processors (Job Men 208) that have very narrow job descriptions and capability. The Job Men 208 also have a brokered communication system with the Boss 206 requiring both sides to define their communication controls in advance. This means that if a compromised Boss 206 wants to create an attack vector with the asset/target 210, the Job Men 208 must already contain the threat vector(s) within the brokered instruction set. Given the fact that the Job Men 208 have their instruction set permanently programmed into their read-only memory, as well as very restricted functionality, the attack surface of the asset/target 210 is significantly reduced. Therefore, in summary, a fourth concept is established:

(4) By utilizing a limited processor 208 and a brokered message set between the target/asset 210 and the capable processor 206, significant isolation of the asset/target is maintained and the attack surface of the asset/target is reduced. When a system employs the four concepts described above, the system is employing the MOB architecture associated with embodiments of the invention.

MOB Hub High Level Embodiment

Figure 3:
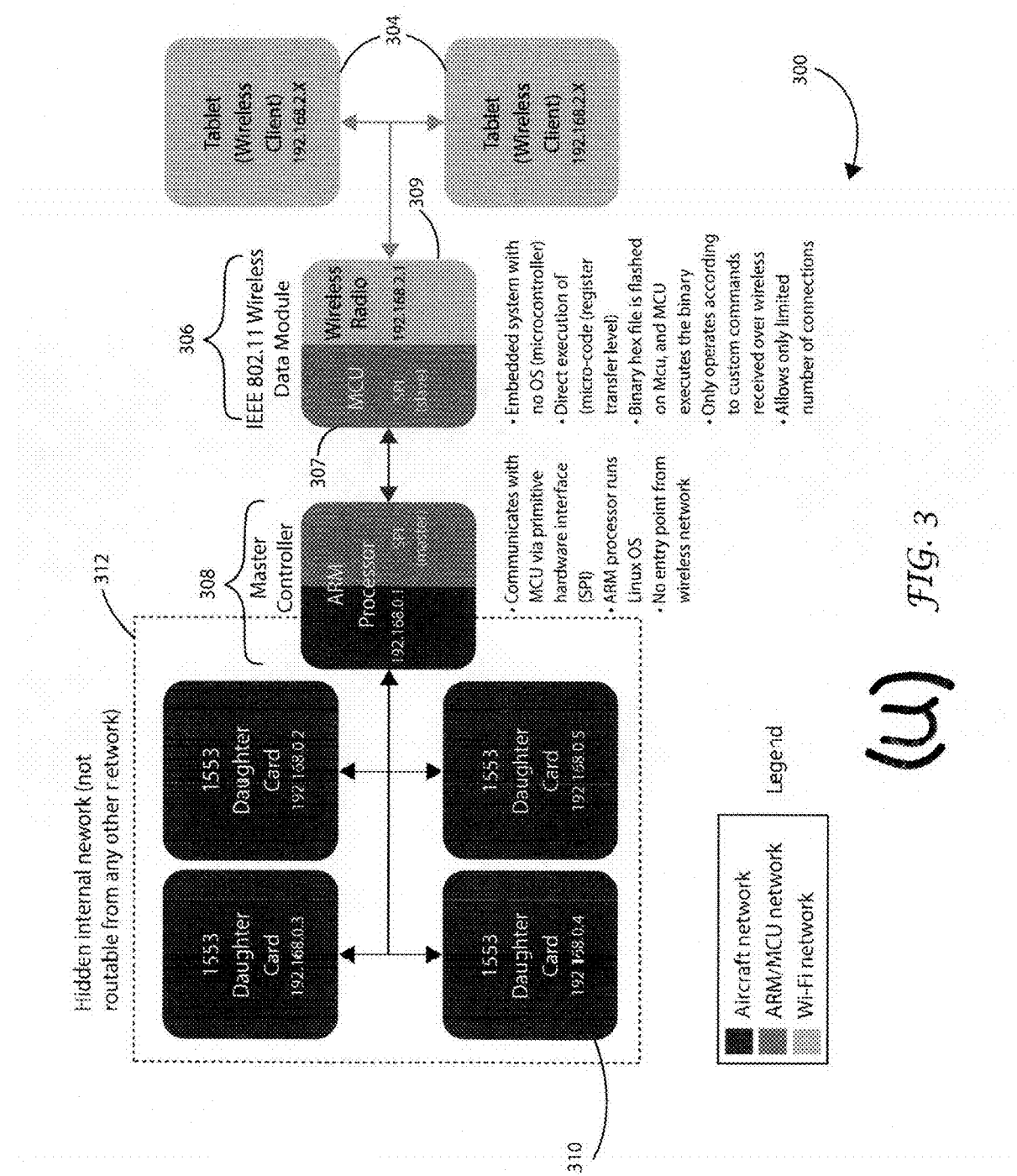
FIG. 3 illustrates a high level component diagram, according to some embodiments of the invention.

FIG. 3 illustrates a MOB hub in a self-contained, network routing and data repackaging scheme from a high level view. Reference character 300 is used to depict the high level component diagram. Reference character 302 is used to depict the MOB Hub, which is a self-contained, network routing and data repackaging scheme embodying the four concepts discussed above. The MOB Hub 302 provides a wireless interface 306 to a MIL-STD-1553 bus 310 on an aircraft network 312 (shown as a dashed box). In the architecture described below, four separate 1553 buses 310 can be connected to the MOB Hub 302. Each of these buses 310 is linked to a myriad of embedded computers, systems, and sensors that have unknown attack surfaces. However, by using the MOB Hub 302 to isolate each bus 310 from the outside network, the actual attack surface that can be exploited is very small. The 1553 busses 310 may also be referred to a bus monitors, 1553 Daughter Cards, and bus chips. As depicted, the MOB Hub 302 interfaces with up to four MIL-STD-1553 buses 310. The MOB Hub 302 may also have modular interfaces so that 1553 Daughter cards 310 can be interchanged with daughter cards that supported other interfaces such as, for example, Ethernet. The modularity of the MOB Hub 302 allows a multitude of interfaces to be developed in order to give wireless capability to a wide range of embedded systems and yet still maintain the isolation of those systems.

The wireless interface 306 is an IEEE 802.11 standard compliant operations wireless data module, sometimes simply referred to as a wireless data module herein. The wireless data module 306 is a microcontroller (MCU) 307 integrated with a wireless radio 309, sometimes referred to as a wi-fi transceiver. The wi-fi transceiver 309 may be thought of as the implementation of the requirements of the Front Man 204 described earlier. The wireless data module 306 does not have an operating system (OS), which makes the attack surface of the wireless data module very narrow.

A master controller 308, which is an advanced reduced instruction set microprocessor (ARM), is in communication with the wireless data module 306. The ARM 308 runs a high level operating system (HLOS). The network interface between the wireless data module 306 and the ARM is SPI, which is a primitive communication protocol. A limited or core implementation of TCP can also be utilized to create this network interface in order to increase data throughput and reliability. In some embodiments, the ARM 308 is running Linux. Of course, other HLOS can also be used such as, for example, Windows.

The master controller's (ARM's) 308 purpose is to implement the features described earlier with respect to the Boss 206. It has no direct access to the mobile computers 304, shown as tablets (wireless clients) in FIG. 3. Likewise, the ARM 308 does not have direct access to the aircraft bus. However, because the master controller's 308 embedded processor is running an HLOS, it can be utilized to operate complex mission requirements and data management tasks.

The 1553 Daughter Cards 310 communicate with the Master Controller (ARM) 308 via an isolated or hidden network 312. Each of the 1553 Daughter Cards 310 is implemented using a microcontroller integrated with a 1553 communication controller (shown as reference character 414 in FIG. 4). The microcontrollers 414 realize the feature set of the Job Men 208 by relying on an instruction set permanently programmed into their read-only memory, as well as very restricted functionality.

MOB Hub Low Level Embodiment

Figure 4:
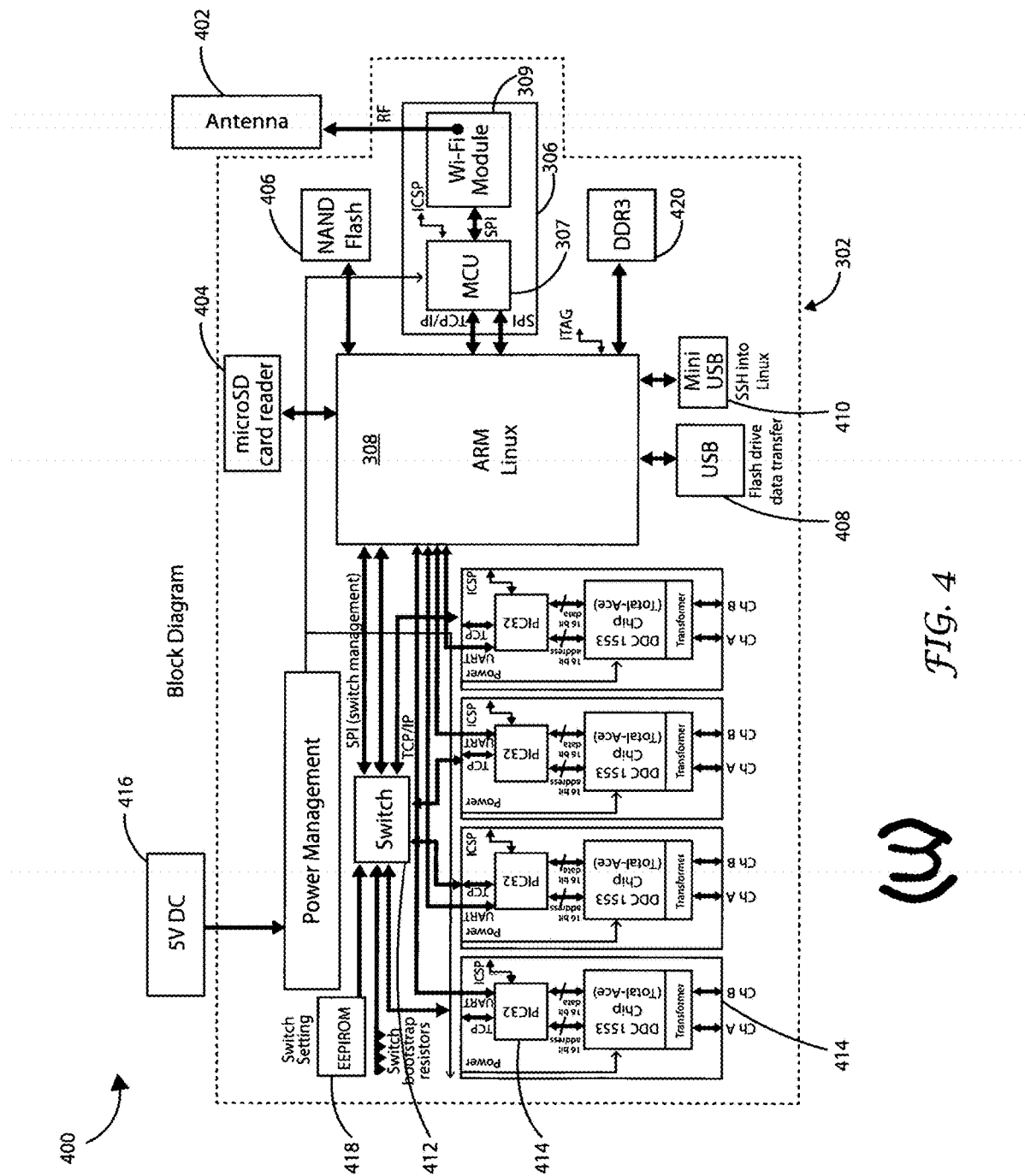
FIG. 4 illustrates a low level component diagram, according to some embodiments of the invention.

FIG. 4 offers an even more detailed block diagram of the MOB Hub 302 and accompanying components. The view is depicted with reference character 400. The MOB Hub 302 is shown inside of the dashed line, representing what is on the circuit board assembly. A radio frequency (RF) antenna 402 is coupled between the wi-fi module 306 and in communication with the mobile computers 304.

A micro secure digital (microSD) card reader port 404 is configured to read a non-volatile memory card that stores an operating system and associated project binaries for the purpose of programming an onboard NAND flash. A NAND flash drive port 406 is connected to the ARM 308. The NAND flash drive port 406 contains the programmed operating system and associated project binaries from the microSD card. A person having ordinary skill in the art will recognize that NAND flash drives are electronic solid-state non-volatile computer storage mediums that can be electronically erased and reprogrammed. NAND flash also uses floating-gate transistors, but they are connected in a way that resembles a NAND gate: several transistors are connected in series, and the bit line is pulled low only if all the word lines are pulled high (above the transistors' $V_T$). These groups are then connected via some additional transistors to a NOR-style bit line array in the same way that single transistors are linked in NOR flash.

A universal serial bus (USB) flash drive port 408 is connected to the ARM 308. A mini-USB port 410 is connected to the ARM 308, and is configured for a secure socket shell (SSH) into HLOS, such as Linux, Android, and Windows. A switch 412 is electrically-connected between the ARM 308 and the 1553 communication bus chips 310. The switch 412 is a network switch (commonly referred to as a switching hub, bridging hub, or as a MAC bridge). MAC is an acronym for medium access control or media access control and is governed by IEEE 802.1D, which is the IEEE MAC bridges standard. A person having ordinary skill in the art will recognize that a network switch is a computer networking device that connects devices together on a computer network, by using packing switching to receive, process and forward data to the destination device. Unlike less advanced network hubs, a network switch forwards data only to one or multiple devices that need to receipt it, rather than broadcasting the same data out of each of its ports.

Each of the 1553 communication bus chips 310 is configured with a dedicated 1553 microcontroller 414 having read-only memory. The microcontroller 414 executes an instruction set permanently programmed into the microcontroller's read-only memory. A 5 V DC power source 416 is electrically-connected with the MCU 307, the ARM 308, and the 1553 communication bus chips 310 and provides the power management for the requisite components. A non-volatile memory, specifically an electrically-erasable programmable read-only memory (EEPROM) 418 is used to store the settings for the switch 412 and is electrically-connected with the switch. A double data rate type 3 synchronous dynamic random-access memory (SDRAM) or sometimes referred to as DDR3 420 is electrically-connected with the ARM 308.

MOB Hub Hardware Characteristics

The network topology (TCP/IP & SPI) for communication with the ARM 308, switch IC 412, and 1553 translator cards 310, in some embodiments of the invention, is as follows below:

- System supervisor correctly implemented to prevent logic races during power up of multiple chips that "boot;"
- 4 GB of Flash (32 Gb);
- 1 GB of DDR3 (8 Gb);
- 1 GHz Single-core Sitara ARM processor (AM3358);
- MicroSD card reader (15.0×11.0×1.0 mm (0.591×0.433×0.039 in);
- ×1 USB 2.0 ports;
- ×1 micro USB port (provides direct connection to host computer for memory management);
- 802.11 b/g 2.4 GHz Wi-Fi chip;
- Microcontroller interface to Wi-Fi chip;
- Ability to re-load ARM processor OS from microSD card (off-board Flash) to the on-board Flash;
- Four 1553 buses configured as MT and RT depending on mission requirement; and
- Micro-HDMI for an external display port.

Physical Characteristics

The physical characteristics of some embodiments of the invention are as follows:

- Dimensions of board: 6 inch×3 inch in rectangle configured to allow the mating of 5 daughter cards;
- (Rigid board structure (at least 90 mil) and extra mounting holes for vibration tolerance (motherboard and daughter cards);
- Weight of motherboard=3.5 ounces;
- Weight of motherboard+one 1553 board=5.3 ounces with one 1553 connector attached, or 4.6 ounces without the cable weight taken into account;
- Weight of wireless daughter card=0.6 ounces; and
- Maximum weight of all modules is 3.5 ounces+(4×1.1 ounces)+0.6 ounces=8.5 ounces.

Power Characteristics

The power characteristics of some embodiments of the invention are as follows:

- Accepts a single 5 V DC rail and does local power conditioning and regulation;
- Power supply selected to appropriately handle the power output characteristics from the 28 V DC to 5 V DC aircraft power supply (provided externally to the MOB Hub);
- With only power to the motherboard, minimum power draw=100 mA @ 5.1 V DC;
- With all modules powered, maximum power draw=3.8 A at 5.1 V DC;
- Adequate provision for heat dissipation; and
- Handles reverse power conditions without failure.

Environmental Characteristics

The environmental characteristics for components in embodiments of the invention are as follows:

- All components meet industrial environmental requirements (−40 to 85 degrees C.); and
- Appropriately handles a tough electrostatic discharge (ESD) environment.

Reliability

Characteristics for the motherboard are IPC class 3/A (space, mil, aero) for highest yield/performance and reliability from the board manufacturer.

Connector/Connection Characteristics

Connection Characteristics are as follows:
Direct wire to external power;
Direct wire to 1553 bus; and
Connector for off-board Wi-Fi antenna.

Operational Use, Methods, and Articles of Manufacture Embodiments

Figure 5:
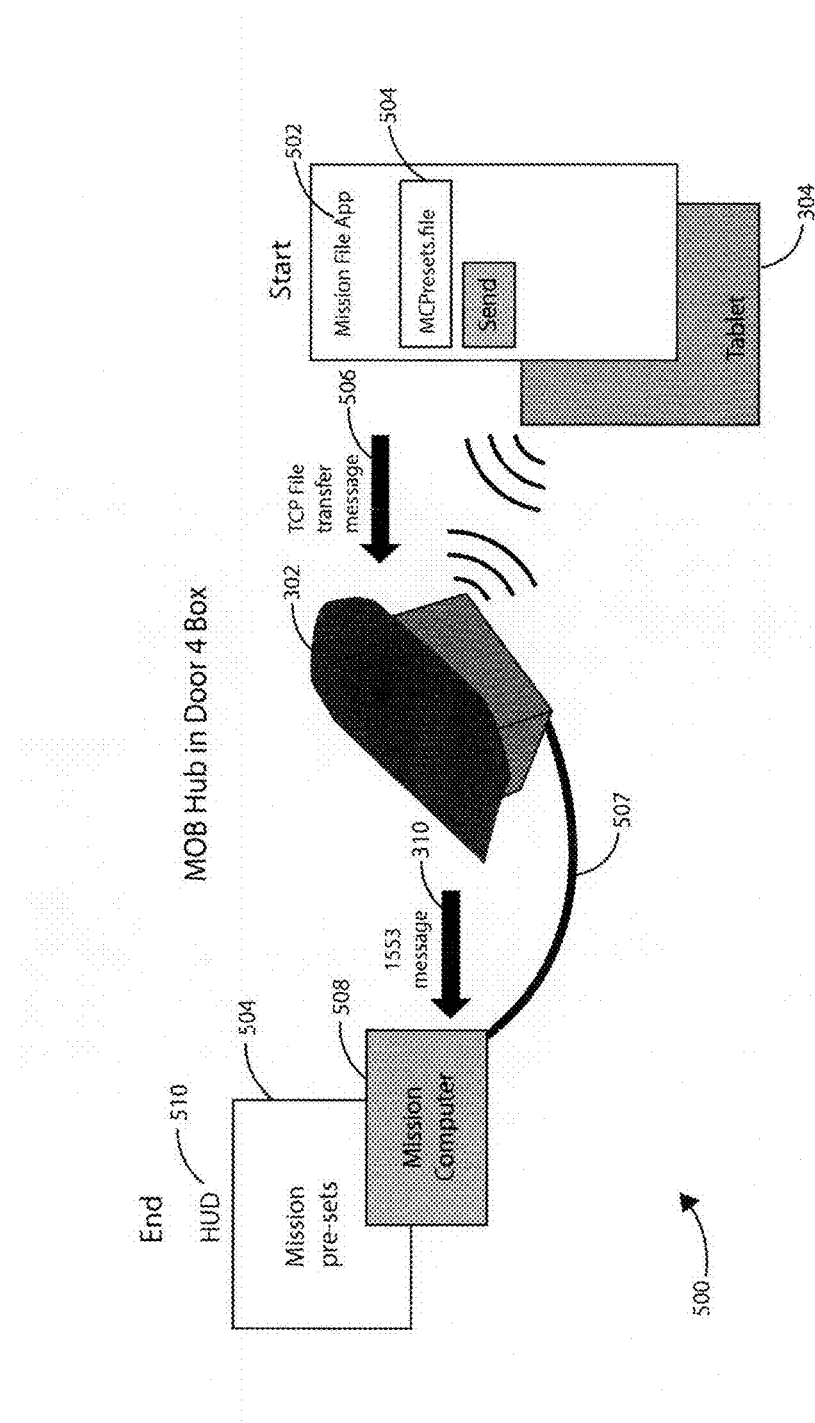
FIG. 5 illustrates an exemplary process diagram of a mission file transfer, according to some embodiments of the invention.
Figure 6:
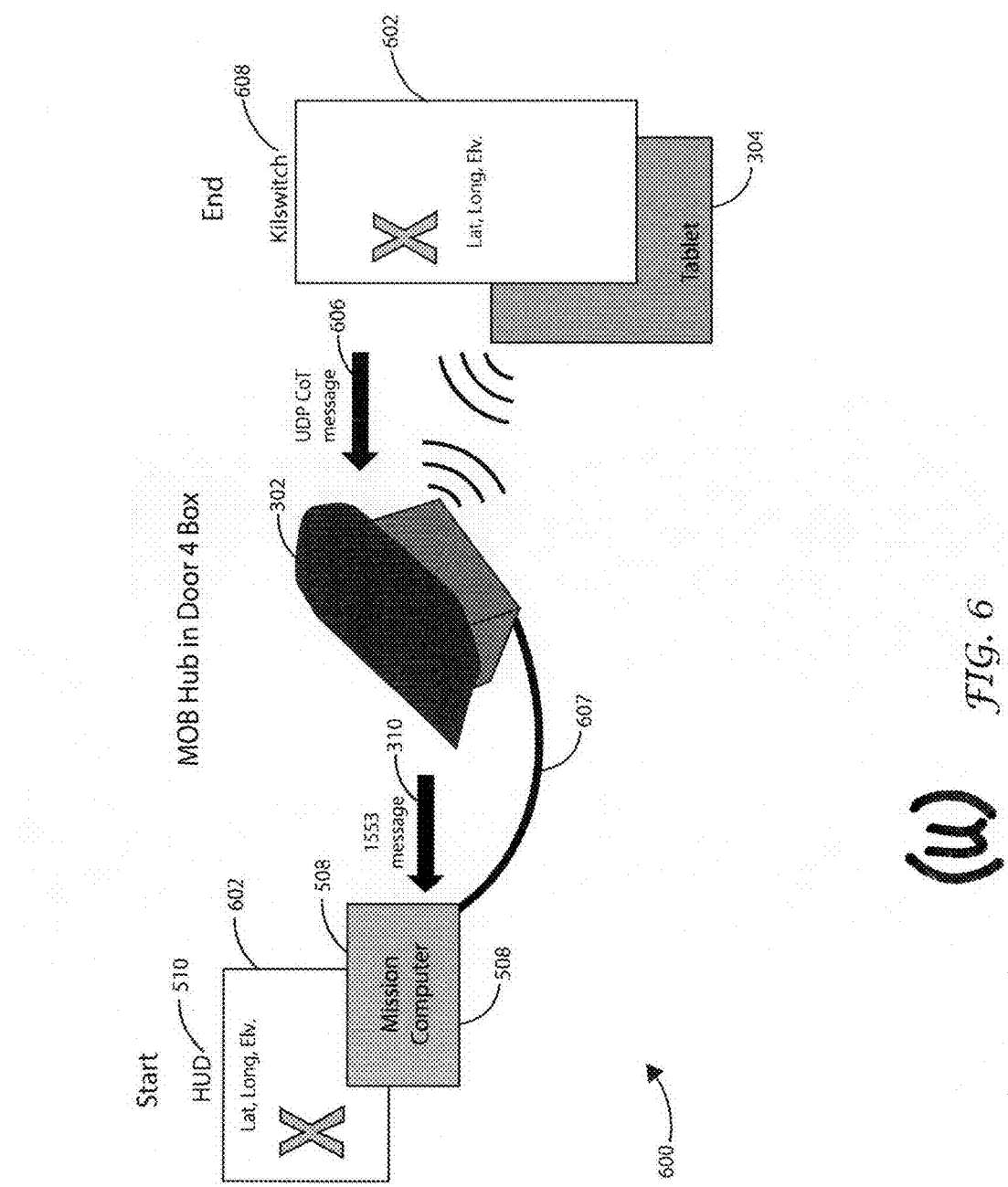
FIG. 6 illustrates an exemplary process diagram of a target transfer from a mission computer to a mobile computer, according to some embodiments of the invention.
Figure 7:
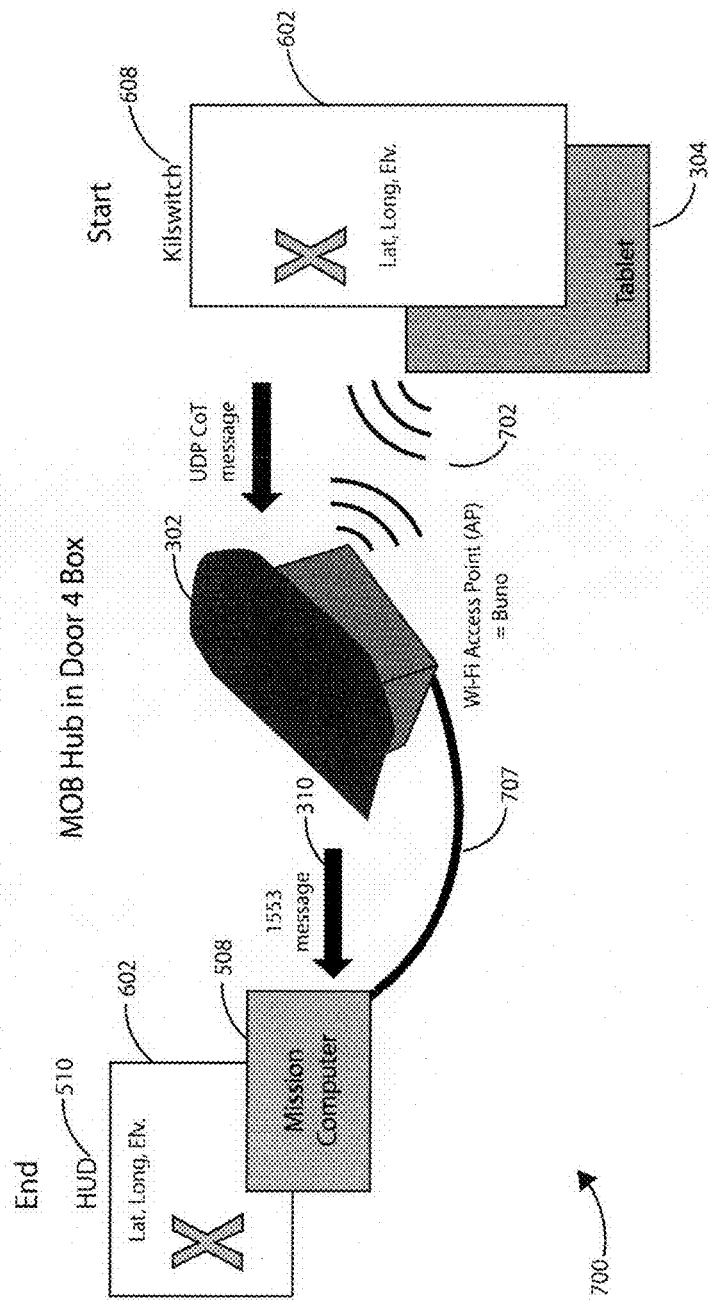
FIG. 7 illustrates an exemplary process diagram of a target transfer from a mobile computer to a mission computer, according to some embodiments of the invention.
Figure 7:

FIGS. 5, 6, & 7 illustrate exemplary process diagrams of using embodiments of the invention. FIGS. 5, 6, & 7 are equally applicable to both methods and articles of manufacture. Embodiments of the invention are directed to non-transitory processor readable medium(s) having stored thereon processor executable instructions that, when executed by the processor(s), cause the processor to perform the process(es) described herein. The term non-transitory processor readable medium include one or more non-transitory processor-readable medium (devices, carriers, or media) having stored thereon a plurality of instructions, that, when executed by the electronic processor (typically a central processing unit—an electronic circuit which executes computer programs, containing a processing unit and a control unit), cause the processor to process/manipulate/act on data according to the plurality of instructions (defined herein using the process/function form). The non-transitory medium can be any non-transitory processor readable medium (media), including, for example, a magnetic storage media, "floppy disk," CD-ROM, RAM, a PROM, an EPROM, a FLASH-EPROM, NOVRAM, any other memory chip or cartridge, a file server providing access to the programs via a network transmission line, and a holographic unit. Of course, those skilled in the art will recognize that many modifications may be made to this configuration without departing from the scope.

In some system embodiments, the electronic processor is co-located with the processor readable medium. In other system embodiments, the electronic processor is remotely located from the processor readable medium. It is noted that the steps/acts/processes/tasks described herein including the figures can be interpreted as representing data structures or sets of instructions for causing the computer readable medium to perform the step/act/process.

Certain embodiments of the invention may take the form of a computer program product on a computer-usable storage medium having computer-usable/readable program instructions embodied in the medium. Any suitable computer readable medium may be utilized including either computer readable storage media, such as, for example, hard disk drives, CD-ROMs, optical storage devices, or magnetic storage devices, or a transmission media, such as, for example, those supporting the internet or intranet.

Computer-usable/readable program instructions for carrying out operations of embodiments of the invention may be written in an object oriented programming language such as, for example, Python, Visual Basic, or C++. However, computer-usable/readable program instructions for carrying out operations of embodiments of the invention may also be written in conventional procedural programming languages, such as, for example, the C or C# programming languages or an engineering prototyping language such as, for example, MATLAB®. However, the concepts may be replicated for many platforms provided that an appropriate compiler is used.

These computer program instructions may also be stored in a computer-readable memory, including RAM, that can direct a computer or other programmable data processing apparatus to function in a particular manner, such that the instructions stored in the computer-readable memory produce an article of manufacture including instructions that implement the function/act specified.

These computer program instructions may also be loaded onto a computer or other programmable data processing apparatus to cause a series of operational tasks to be performed on the computer or other programmable apparatus to produce a computer implemented process such that the instructions that execute on the computer or other programmable apparatus provide tasks for implementing the functions/acts specified.

Embodiments of the invention can support many different mission sets. FIGS. 5 through 7, therefore, are understood to show only a small portion of the possible uses of its Concept of Operations (Con Ops). Each of the illustrated mission sets in FIGS. 5 through 7 have been successfully demonstrated in the lab environment. Some figures use the acronym KILSWITCH, which is a U.S. Navy targeting application for a "Kinetic Integrated Low-cost SoftWare Integrated Tactical Combat Handheld." A person having ordinary skill in the art will recognize that other targeting applications can also be used with embodiments of the invention. Additionally, the mission sets refer to target coordinates being displayed as latitude, longitude, and elevation. However, any coordinate system may be used. Additionally, the target coordinates are usually displayed as an identification label, although other variations are also possible without detracting from the merits or generalities of embodiments of the invention.

Referring to FIG. 5, reference character 500 depicts the wireless transfer of a mission file. An operator (user) uses a mobile computer (tablet) 304 having a graphics user interface (GUI). The mobile computer 304 is running a mission file application 502. Using the mission file application 502, the user selects a mission computer presets file 504 to wirelessly transfer to a mission computer (MC) 508 on a target aircraft.

The mobile computer 304 processes a transfer command to transmit the mission computer presets file 504 to the MOB HUB 302. The mission computer presets file 504 is wirelessly transferred 506 as a transmission control protocol (TCP) file transfer message to the MOB Hub 302. The mission computer presets file 504 is then transferred 507 from the MOB Hub 302, through a 1553 communication bus interface 310, to the mission computer 508 on the target aircraft. The mission computer presets file 504 is then displayed on a heads up display (HUD) 510.

Referring to FIG. 6, reference character 600 depicts wireless transfer of target coordinates between the mission computer on the target aircraft and the mobile computer 304. An operator such as a pilot, designates a target 602 on a HUD 510. The target 602 has has distinct target coordinates 602 of latitude, longitude, and elevation associated with it. The operator instructs that the target coordinates be transferred 607 from the mission computer 508 to the MOB Hub 302 as a TCP file transfer message through the 1553 communication bus interface 310. The target coordinates 602 are then wirelessly transferred 607 from the MOB Hub 302 as a user datagram protocol (UDP) message to the mobile computer 304 having a graphics user interface (GUI). The mobile computer 304 is running a targeting program, sometimes referred to as a targeting application, 608. The target coordinates 602 are displayed on the mobile computer 304.

Referring to FIG. 7, reference character 700 depicts the wireless transfer of targeting coordinates from the mobile computer 304 to the mission computer 508. The mobile computer 508 has a graphics user interface (GUI) and is paired to a MOB Hub 302. The pairing is through a wireless access point 702. The mobile computer 304 is running a targeting computer program (targeting application) 608. The target 602 is displayed on the GUI. The target 602 has associated target coordinates of latitude, longitude, and elevation. The user instructs the mobile computer 304, which is executing the targeting computer program 608, to wirelessly transfer 702 the target coordinates 602 from the mobile computer 304 to the MOB Hub 302 as a UDP message.

The target coordinates 602 are transferred 707 from the MOB Hub 302 to the mission computer 508 on the targeting aircraft. The transfer 707 is a message with the target coordinates 602 and is routed by the 1553 communication bus interface 310 that is operatively connected between the MOB Hub 302 and the mission computer 508. The target coordinates 602 are displayed as an identification label on the HUD 510.

To accomplish the requisite mission sets, the MOB Hub 302 is integrated into a special enclosure allowing the MOB Hub to be mounted in proximity to the MIL-STD-1553 buses 310. The special enclosure is generically referred to in FIGS. 5, 6, & 7 as a "Door 4 Box." The enclosure is special because it is configured per individual aircraft specifications to account for varying environmental certifications, such as amongst different rotary wing platforms and different fixed wing platforms. Likewise, land-based and sea-based vehicles would also have different enclosures based on their varying environmental certifications.

All missions can be executed interchangeably without the MOB Hub 302 requiring any reconfiguration. A person having ordinary skill in the art will recognize that the heads up display (HUD) 510 is operatively associated with the mission computer 508. Additionally, a person having ordinary skill in the art will recognize that the HUD 510 can be a display shown on a pilot's visor, elsewhere in the cockpit, and also in a tactical operations center (TOC). Likewise, a person having ordinary skill in the art will recognize that the target aircraft may be a variety of unmanned aerial vehicles (UAV) and, as such, the HUD 510 can be a display screen in a TOC or control room. Furthermore, coordinate information may also be printed in the TOC or control room or used in systems configured for the information.

Systems with Cyber Kneeboards

Embodiments of the invention may include the use of kneeboards. FIGS. 8 through 12 and 14 depict the use of kneeboards, according to some embodiments of the invention. Current kneeboard solutions provide military operators with a ruggedized and protected enclosure for their mobile tablet while operating in a tactical environment. The many form factors ensure ergonomic requirements are met while maintaining safety of flight standards. The Cyber Kneeboard associated with some embodiments of the invention are divorced from the physical characteristics of the various industry and government provided kneeboard solutions. In particular, the Cyber Kneeboard associated with some embodiments of the invention, in particular, includes the following features: 1) an integrated wireless radio transceiver; 2) enables various commercially-available mobile tablets to communicate via Universal Serial Bus (USB) protocol to the wireless radio transceiver embedded in the Cyber Kneeboard; 3) provides an integrated encryption engine; 4) provides a key fill and storage system that is fully disconnected from the mobile tablet; and 5) utilizes a re-chargeable battery for system operation.

Cyber Kneeboard with Integrated Wireless Radio Transceiver:

This feature allows mobile tablets (mobile computers) to have their built-in wireless transceivers disabled as required by DoD Information Assurance (IA) policy. However, when the operator requires mission essential wireless access, their mobile tablet can be inserted into the Cyber Kneeboard and wireless access is made available through the wireless transceiver embedded in the Cyber Kneeboard.

Communicate Via USB Protocol:

Mobile tablets utilize the USB standard to communicate with external devices. The Cyber Kneeboard is designed to utilize USB communication over a wired connection to the client mobile device. This allows for the Cyber Kneeboard to interface with a broad range of mobile tablets, thus extending the usability of the Cyber Kneeboard concept.

Integrated Encryption Engine:

This feature enables a commercial tablet to utilize government encryption standards like NSA Type 1. Applications on the tablet simply communicate with the Cyber Kneeboard in clear text. The Cyber Kneeboard encryption engine module then creates the cypher text and hands the encrypted data to the wireless transceiver for transmission.

Key Fill and Storage System Disconnected from the Mobile Tablet:

The process of key filling the Cyber Kneeboard is completed using government issued keys and key fill devices. The mobile tablet has no access or insight into the key storage or the fill process.

Re-Chargeable Battery for System Operation:

The rechargeable battery provides power for the encryption/decryption module and wireless transceiver. Additionally, the battery is a backup power source for the mobile tablet. The trickle charge provided by the battery is managed by a power management circuit that controls when the backup power is utilized by the tablet.

When the Cyber Kneeboard is integrated with NSA Type 1 technology, it will become a controlled cryptographic item (CCI) and will be subject to special accounting controls and required markings. Ultimately this will enable a greater level of physical security because of the special handling and accounting required for CCIs.

Cyber Kneeboard Physical Configurations

Figure 8:
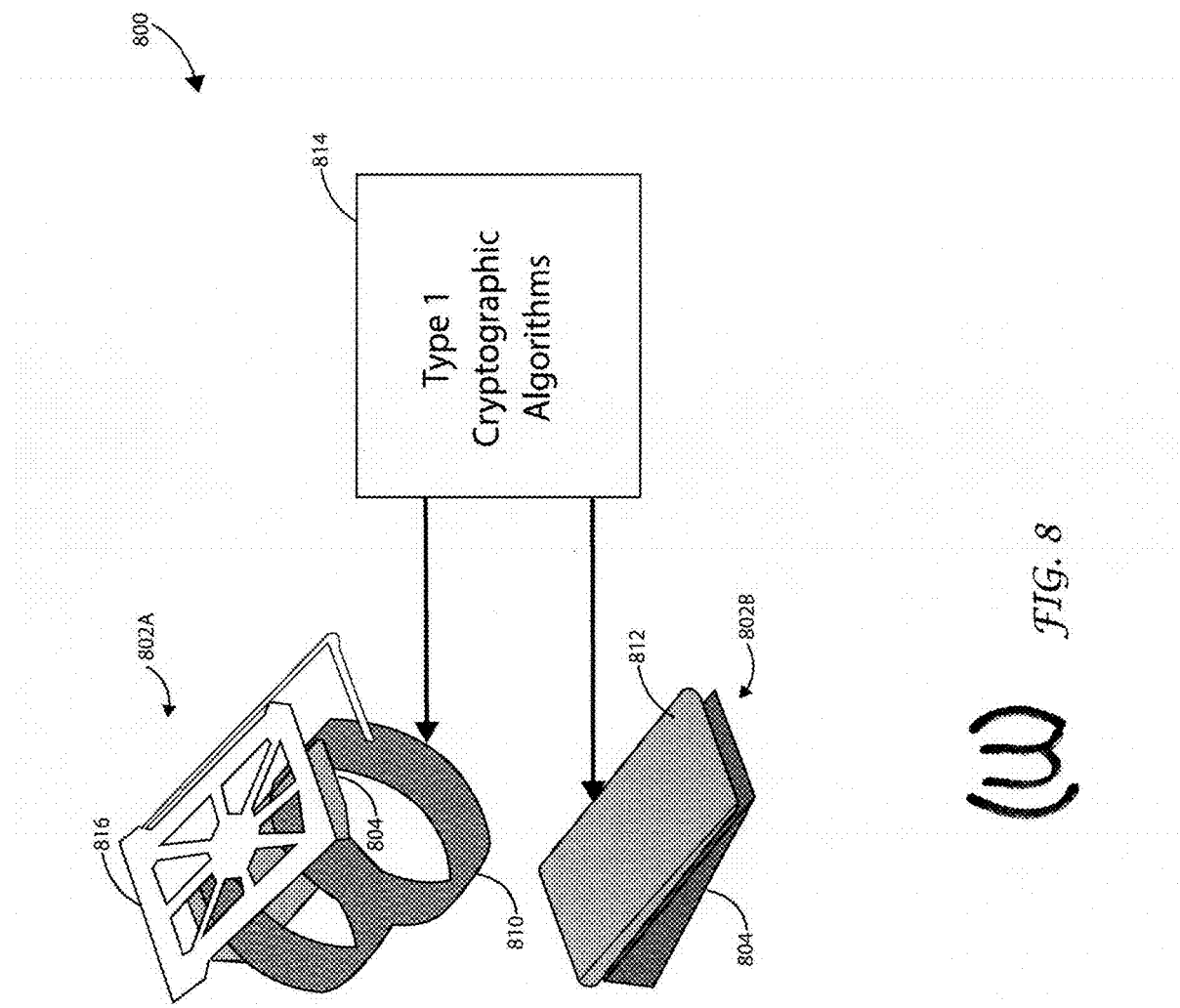
FIG. 8 illustrates cryptographic algorithms integration with two different kneeboards, according to some embodiments of the invention.
Figure 9:
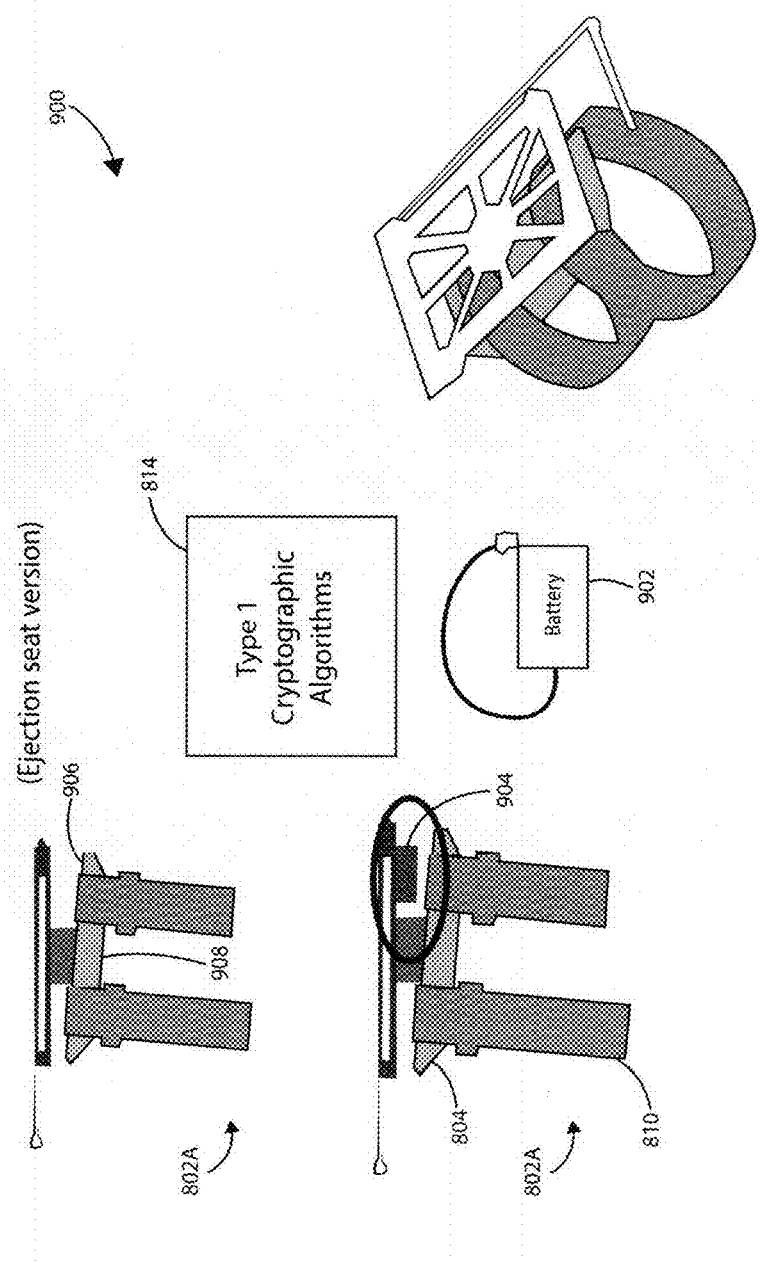
FIG. 9 illustrates cryptographic algorithms and battery integration with an ejection seat kneeboard, according to some embodiments of the invention.

Several possible cyber kneeboard configurations exist. Included in the various configurations are the removable attachment of the kneeboard to the operator's (pilot's) body. FIG. 8 generally depicts, with reference character 800, both an ejection seat 802A and a rotary wing 802B cyber kneeboard. Both the ejection seat 802A and rotary wing 802B kneeboard configurations provide options for integration with cyber and wireless technology. FIG. 8 shows Type 1 Cryptographic Algorithms 814 integration into the platform 804 of the kneeboard 802A/802B. The cryptographic algorithms 814 may be generically referred to as an encryption/decryption module. One option for integration includes the Harris Sierra II Standard Module. FIG. 9 generally depicts, with reference character 900, cryptographic algorithms 814 and battery 902 integration with an ejection seat kneeboard 802A. All cyber kneeboard 802A/802B embodiments can include a stylus for ease of use. The figures directed to the ejection seat cyber kneeboard 802A embodiments include a generic representation of the stylus.

The cyber kneeboard 802A/802B includes a platform 804 having a first side 906 and a second side 908 (FIG. 9). It is apparent when viewing the respective figures that the platform 804 is shaped differently, depending on operational circumstances, such as between the ejection seat 802A and rotary wing 802B kneeboards. An attachment device 810 is on the second side 908 said and is used to removable attach the platform to a pilot's leg. Some possible removable attachment mechanisms include straps with buckles or hasps, hook and loop straps, and tape. Some configurations may also be attached to a pilot's arm or torso, depending on application-specific conditions. The platform 804 is configured to removably-secure the mobile computer 304 to the first side 906. As shown in FIGS. 8 and 9, the platform 804 can have a frame 816 attached to its first side 806 which allows the pilot to safely secure the mobile computer 304.

Additionally, a re-chargeable battery 902 is incorporated into the platform 804 and provides power for both the platform 804 and the encryption/decryption module 814. The re-chargeable battery 902 is configured to provide about 3.2 V DC to about 3.7 V DC. The location of the positioning of the encryption/decryption module 814 and the re-chargeable battery 902 is shown in FIG. 9 with reference character 904. As shown, the positioning is on the underside of the frame 816 of the platform 804, but may also be positioned in other locations depending on operational conditions. The encryption/decryption module 814 communicates with the mobile computer 304.

Referring to FIG. 9, in the ejection seat version 802A, the encryption/decryption module 814 is an NSA Type I module. One possible integration for the NSA Type I module such as the Harris Sierra II Standard module configured for: 1) data throughput rates up to 100 Mbps; 2) higher data rates are achievable with different interfaces; 3) small size: about 2.5 inches×3.0 inches; 4) red and black interface connectors; 5) 64 MB Flash and 16 MB SRAM memories for algorithm and key storage; 6) dedicated external reset, zeroization, and tamper inputs; 7) under-voltage and over-voltage detection; 8) optional coin-size battery for memory retention; 9) operating temperature: about −40° C. to +85° C.; 10) Supply Voltage: about 3.3 V; 11) Core application software included; and 12) field software is reprogrammable.

Figure 10:
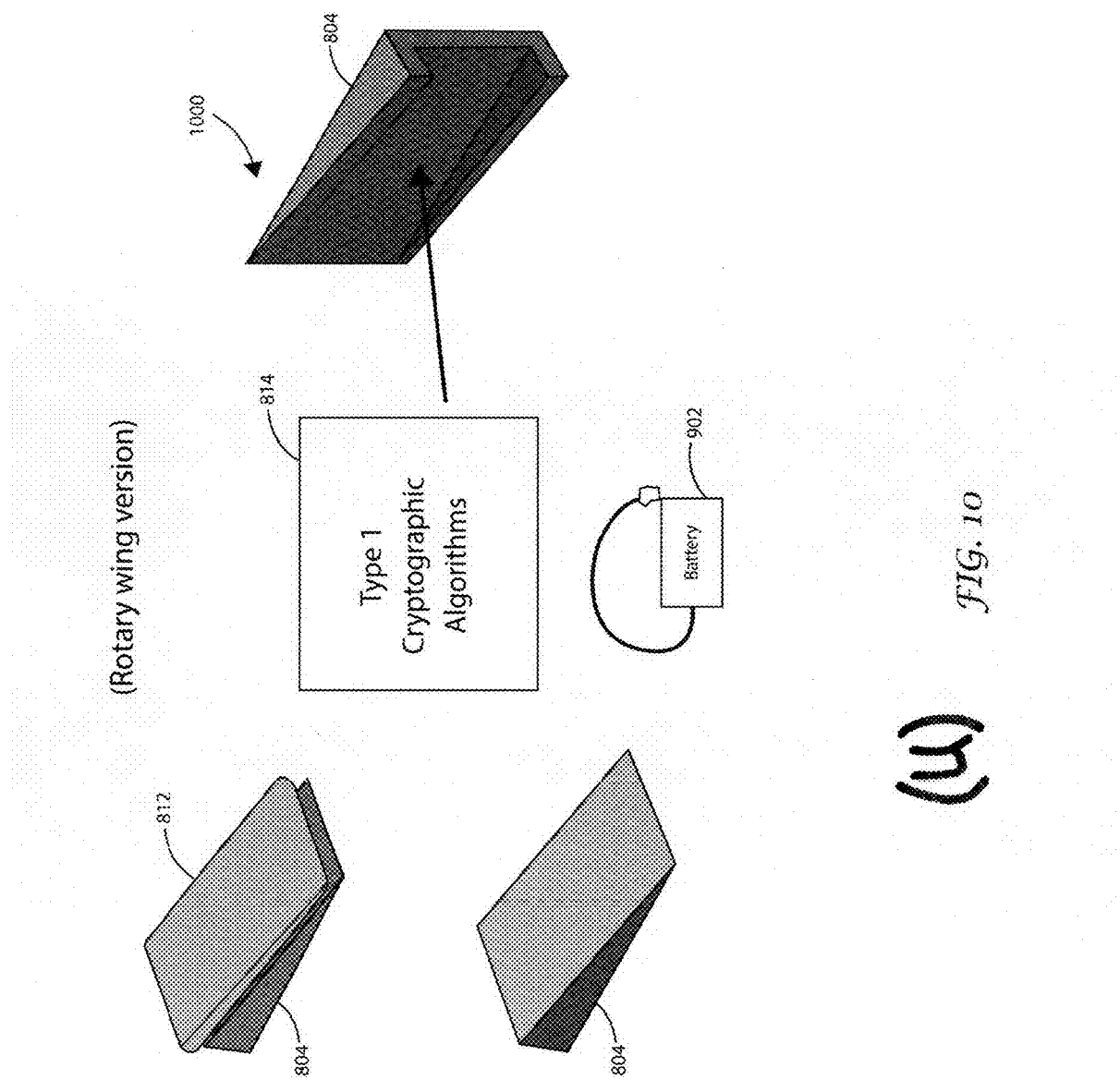
FIG. 10 illustrates cryptographic algorithms and battery integration with a rotary wing kneeboard, according to some embodiments of the invention.

As depicted in FIG. 10 by reference character 1000, a pouch connection structure 812 is attached to the platform 804 for mobile computer 304 attachment. The platform 804 has a void on its lower side. The encryption/decryption module 814 and re-chargeable battery 902 are housed in the void and attached to the underside of the platform 804. In some embodiments, the encryption/decryption module 814 is integrated with an NSA Type 1 Daughter card. In other embodiments, the encryption/decryption module 814 is integrated with an NSA Type 2 Daughter Card.

Figure 11:
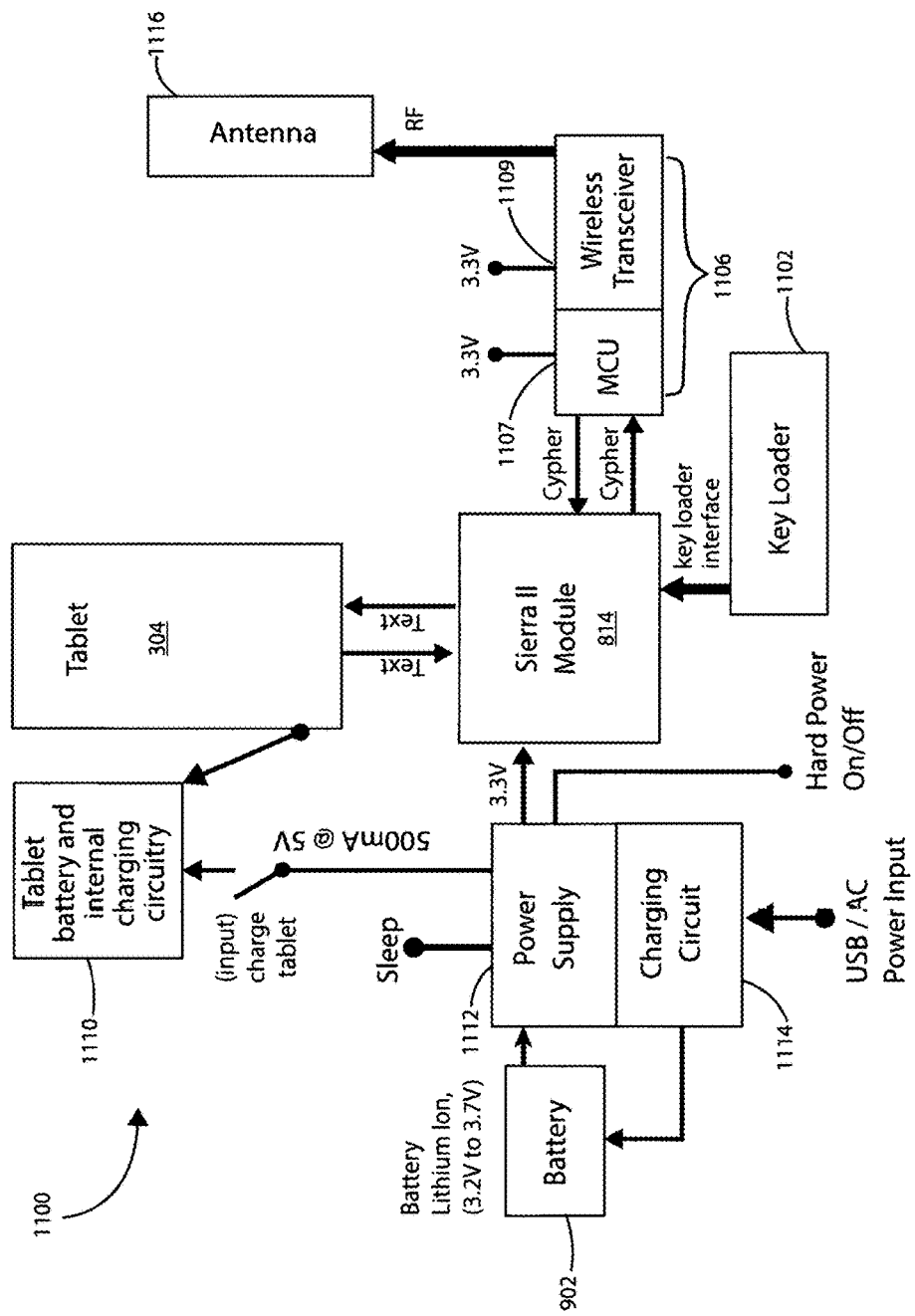
FIG. 11 illustrates an exemplary cyber kneeboard block diagram, according to some embodiments of the invention.

FIG. 11, depicted with reference character 1100, illustrates an exemplary cyber kneeboard block diagram. The cyber kneeboard includes an IEEE 802.11 standard compliant operations wireless data module 1106 having a microcontroller (MCU) 1107 integrated with a wireless radio 1109. The wireless radio 1109 is a wi-fi transceiver, sometimes referred to as a wireless transceiver. An RF antenna 1116 is electrically-coupled to the wireless transceiver 1109. A key fill and storage system 1102, sometimes referred to as a key loader, is electrically-connected with the encryption/decryption module 814. FIG. 11 also generically depicts the internal charging circuitry 1110 for the mobile computer 304 (tablet) and re-chargeable battery 902. Additionally, the power supply and charging circuitry are generically shown with reference characters 1112 & 1114.

Cyber Kneeboard and MOB Hub Pairing

Figure 12:
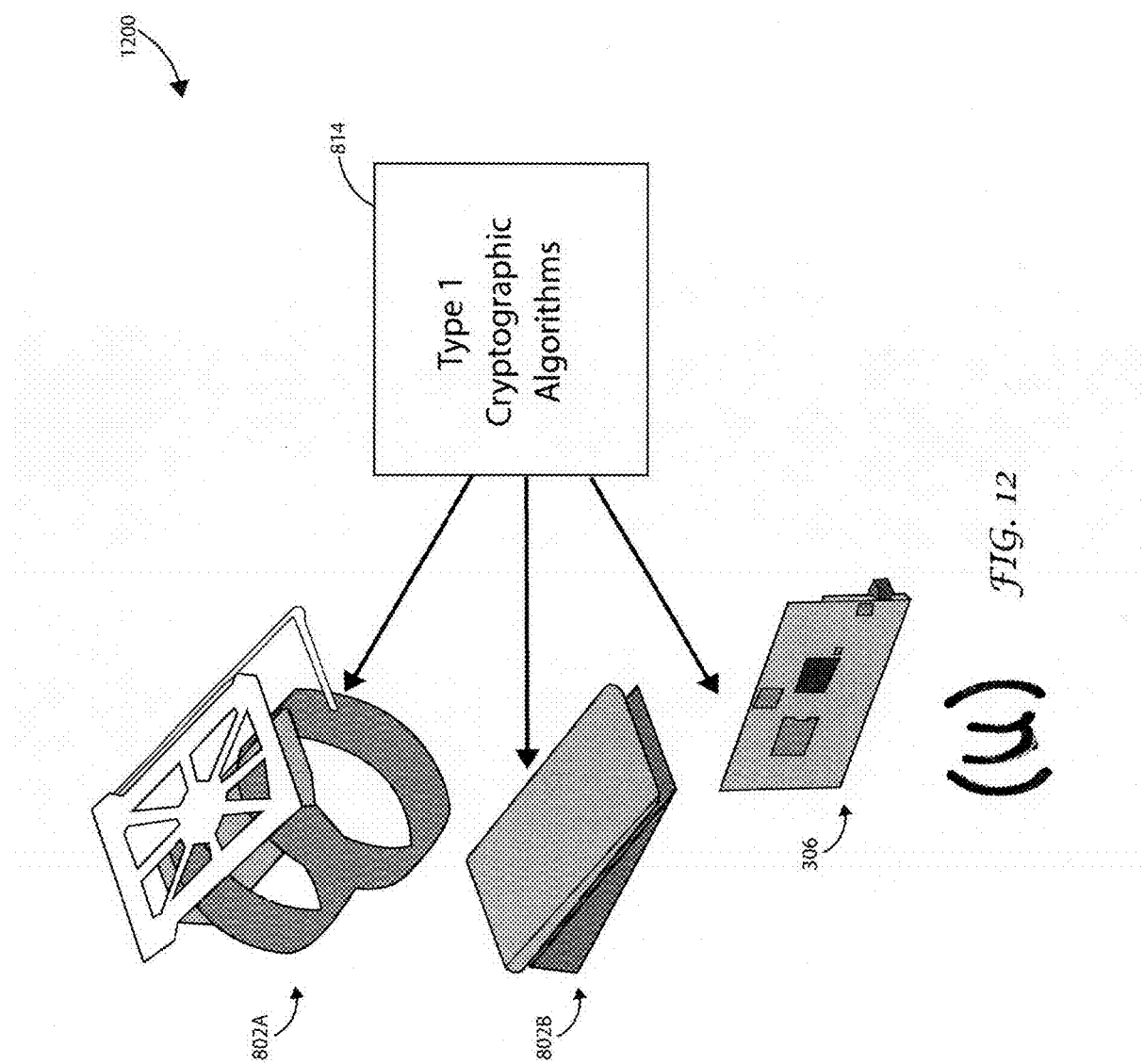
FIG. 12 illustrates cyber kneeboards and a multilayered obstructed brokered (MOB) hub integrated with a crypto engine, according to some embodiments of the invention.

When the cyber kneeboard 802A/802B is integrated with NSA Type 1 technology, then the MOB Hub 302 will have an NSA Type 1 module (shown in some figures as the Sierra II Module 814) integrated into its wireless interface. Ultimately, mission requirements are the deciding factor behind the selection of the appropriate encryption engine for both the Cyber Kneeboard 802A/802B and the Mob Hub 302. Embodiments of the invention create a modular system for the MOB Hub 302 that enables the IEEE 802.11 Wireless Data Module 306 (the microcontroller 307 integrated with the Wi-Fi transceiver 309) to be replaced with an NSA Type 1 wireless daughter card, or any another encryption module, as required by the mission. FIG. 12, depicted by reference character 1200, illustrates how the Sierra II Standard Module 814 variants are the current backbone for the Cyber Kneeboard(s) 802A/802B as well as the MOB Hub's wireless interface 306.

Figure 13:
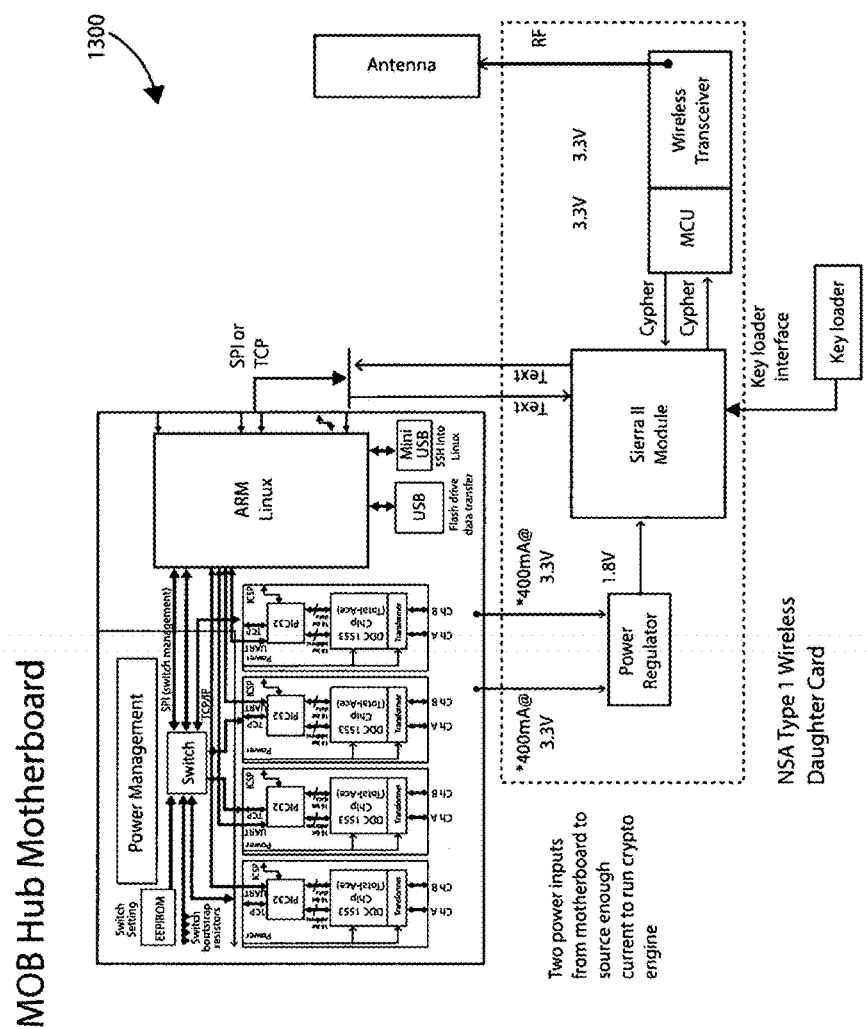
FIG. 13 illustrates NSA Type 1 Wireless Daughter Card Integration with a multilayered brokered obstructed hub, according to some embodiments of the invention.
Figure 14:
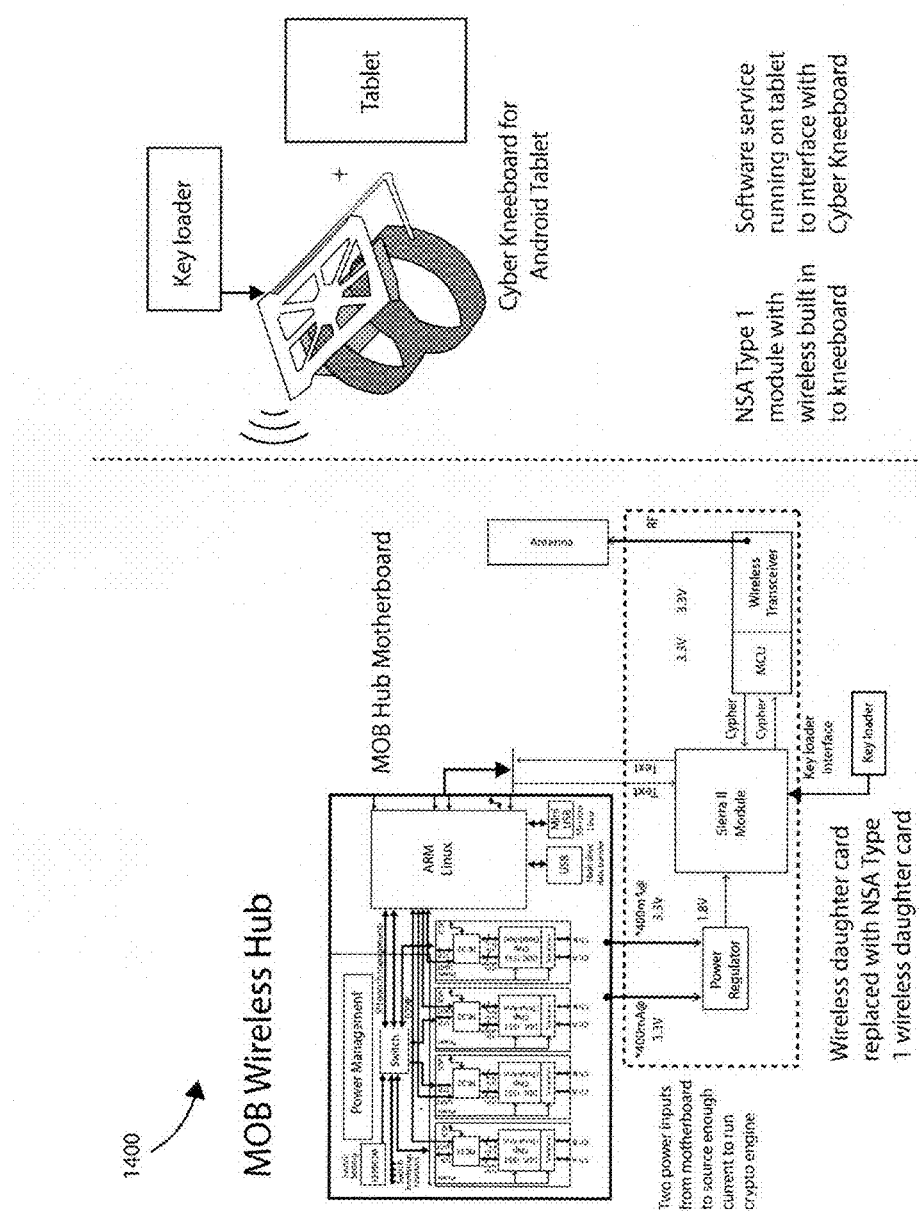
FIG. 14 is a summary illustration of a multilayered brokered obstructed hub and NSA Type 1 Wireless Daughter Card paired with a cyber kneeboard, according to some embodiments of the invention.

Reference character 1300 in FIG. 13 depicts an NSA Type 1 wireless daughter card integration with the MOB HUB. The purpose of FIG. 13 is to show that a variant of the Sierra II Standard Module can be developed for integration with the MOB Hub's wireless interface 306. Two power inputs are used to source enough current to run the crypto engine. FIG. 14 combines each of the technical aspects discussed and presents them in one figure for ease of view and depicted with reference character 1400. FIG. 14 provides a summary illustration highlighting the MOB Hub and NSA Type 1 Wireless Daughter Card paired with a Cyber Kneeboard to securely enable wireless transmission of data between aircraft embedded systems and mobile devices.

Cyber Analysis and Proof of Concept

FIGS. 15 through 22 are directed to cyber analysis and proof of concept for embodiments of the invention. The methodology utilized for performing a preliminary cyber analysis of the MOB Hub implementation of the MOB Architecture was performed. Initial results of limited penetration testing is provided. Lastly, additional security features are discussed including methods to enhance the physical security of the MOB Hub from a tamper perspective.

Analysis Methodology Used

The following key characteristics of the MOB Architecture require verification as to the accuracy of the underlying assumptions:

First Assumption: By placing a very limited processor with a very narrow attack surface in-between the clients and the capable processor, an attacker is limited to a small subset of attack vectors with which to engage the limited processor before the attacker can reach the capable processor.

First Assumption Verification Required: How narrow is the attack surface of the limited processor that is used to implement the function of the Front Man? What are the known threat vectors?

Second Assumption: By creating a brokered interface between the capable processor and the limited processor, the attack surface of the capable processor is extremely reduced because both processors are forced to maintain a complete set of everything that is allowed to communicate over the interface.

Second Assumption Verification Required: Is the limited message set actually limited enough? Do exploit(s) exist that can be packaged as valid message(s) and be passed through the system to compromise the target/asset?

Third Assumption: By employing a limited or primitive, physical communication standard between the limited processor and the capable processor, the attack surface of the capable processor is further reduced.

Third Assumption Verification Required: When utilizing a limited or primitive communication protocol, how reduced is the attack surface of the capable processor? What are the known technical vulnerabilities that exist for these limited or primitive interfaces? Do these vulnerabilities translate into real threats to the target/asset?

Fourth Assumption: By utilizing a limited processor and a brokered message set between the target/asset and the capable processor, significant isolation of the asset/target is maintained and the attack surface of the asset/target is reduced.

Fourth Assumption Verification Required: How narrow is the attack surface of the limited processors that are used to implement the functions of the Job Men? What are the known threat vectors?

Given the underlying assumptions of the MOB Architecture, the following tests were performed:

First Test—Attack Surface of the Boss (no Front Man): Is the attack surface of the capable processor (Boss) actually reduced by implementing a Front Man (limited processor) interface? This question can be answered by first determining the attack surface of the capable processor without a Front Man interface.

Figure 15:
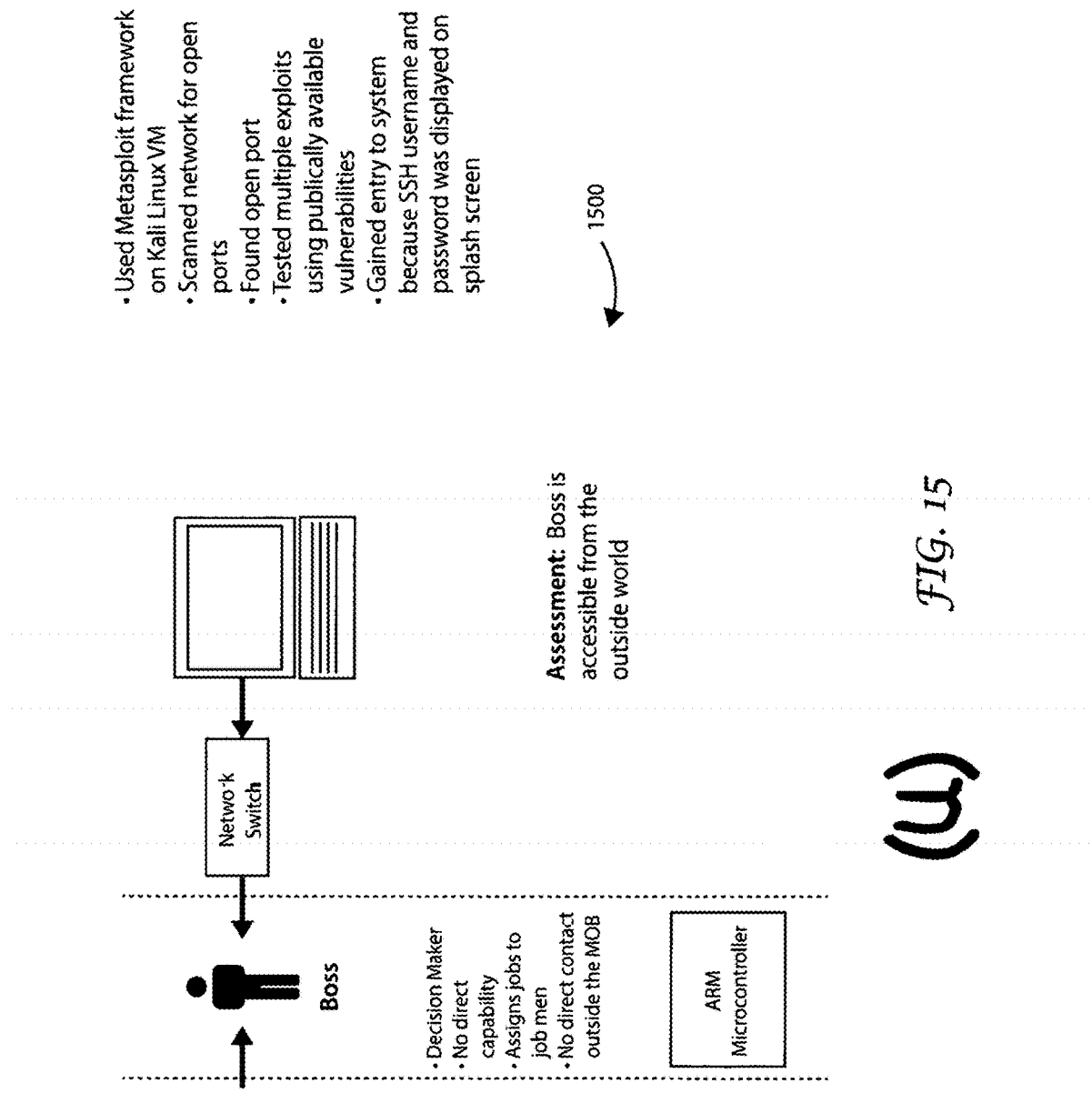
FIG. 15 illustrates a first cyber-analysis of some embodiments of the invention.

Based on the test methodology depicted in FIG. 15 and depicted using reference character 1500, the capable processor (Boss), without a Front Man, is reachable by an outside network and has a wide attack surface. The Boss is susceptible to all of the traditional network attack vectors, available in hacker software frameworks like Metasploit.

Second Test—Attack Surface of the Boss (with Front Man): If a limited processor (Front Man) provides an interface cover to the Front Man, can the same tools be utilized to reach the Boss (capable processor)?

In this scenario, an IEEE 802.11 Wireless Data Module is programmed as a wireless AP into the read-only memory of the microcontroller (limited processor). The AP has WEP enabled. The functionality is very limited because the microcontroller is programmed to receive a limited message set. Meaning, it does not know how to respond to the myriad of other TCP/IP message traffic that might be sent across the wireless link by an attacker.

Figure 16:
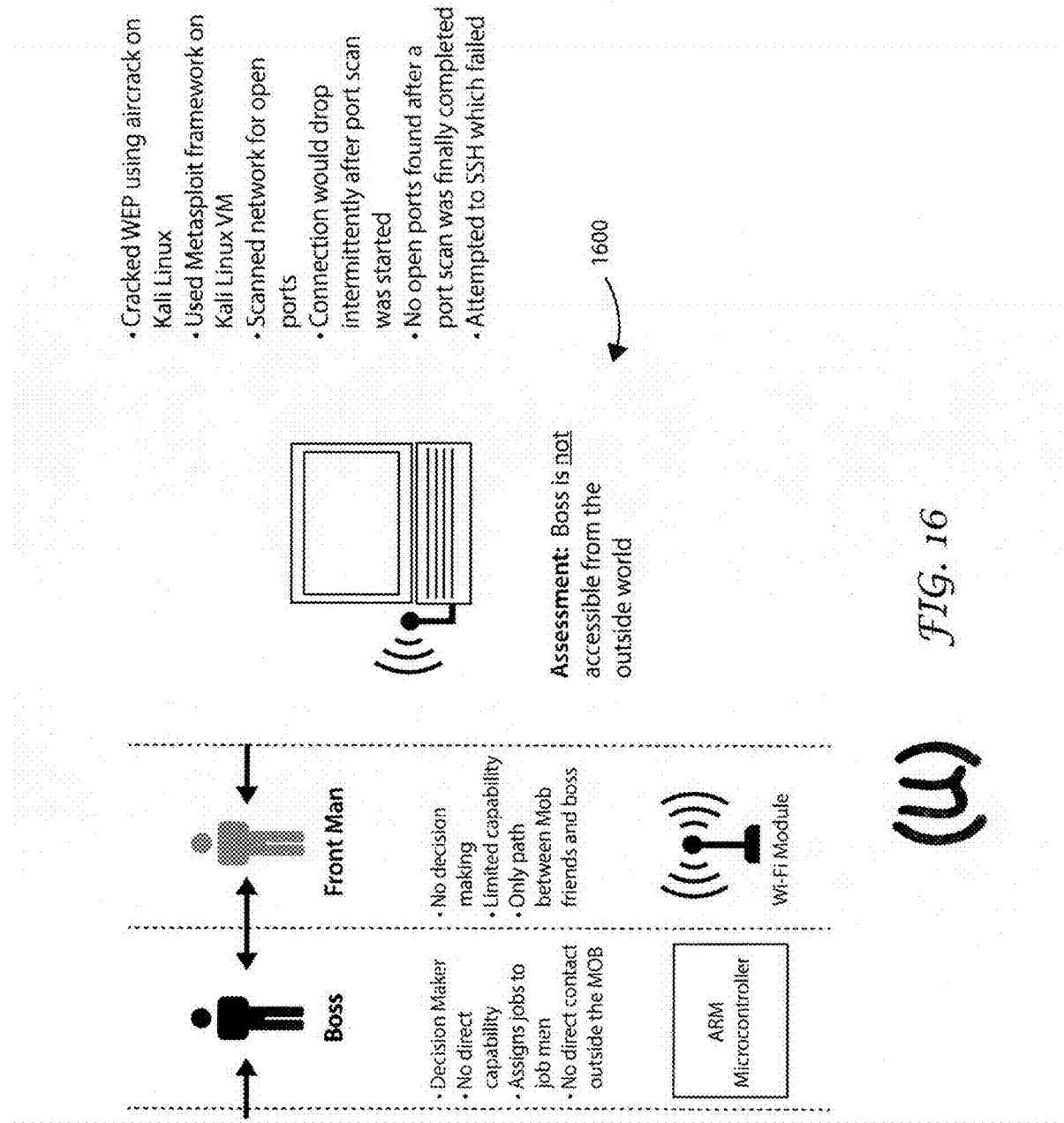
FIG. 16 illustrates a second cyber-analysis of some embodiments of the invention.

According to the testing approach carried out in FIG. 16 and depicted using reference character 1600, a traditional WEP crack was successfully employed. However, this only allowed the attacking computer to connect to the Front Man, not the Boss. Once connected to the Front Man, all of the employed network hacking attempts failed. The limited processor did not have the capability to communicate back to the attacking computer in order for the attacker to complete a vulnerability assessment. The microcontroller has no operating system, no file system, and only one open port. Therefore, the determination is that the limited processor provides a significant amount of isolation to the Boss Third Test—Indirect Access to Boss: If a tablet (Friend) can be compromised, can it be used to indirectly influence the Boss via the Front Man?

Figure 17:
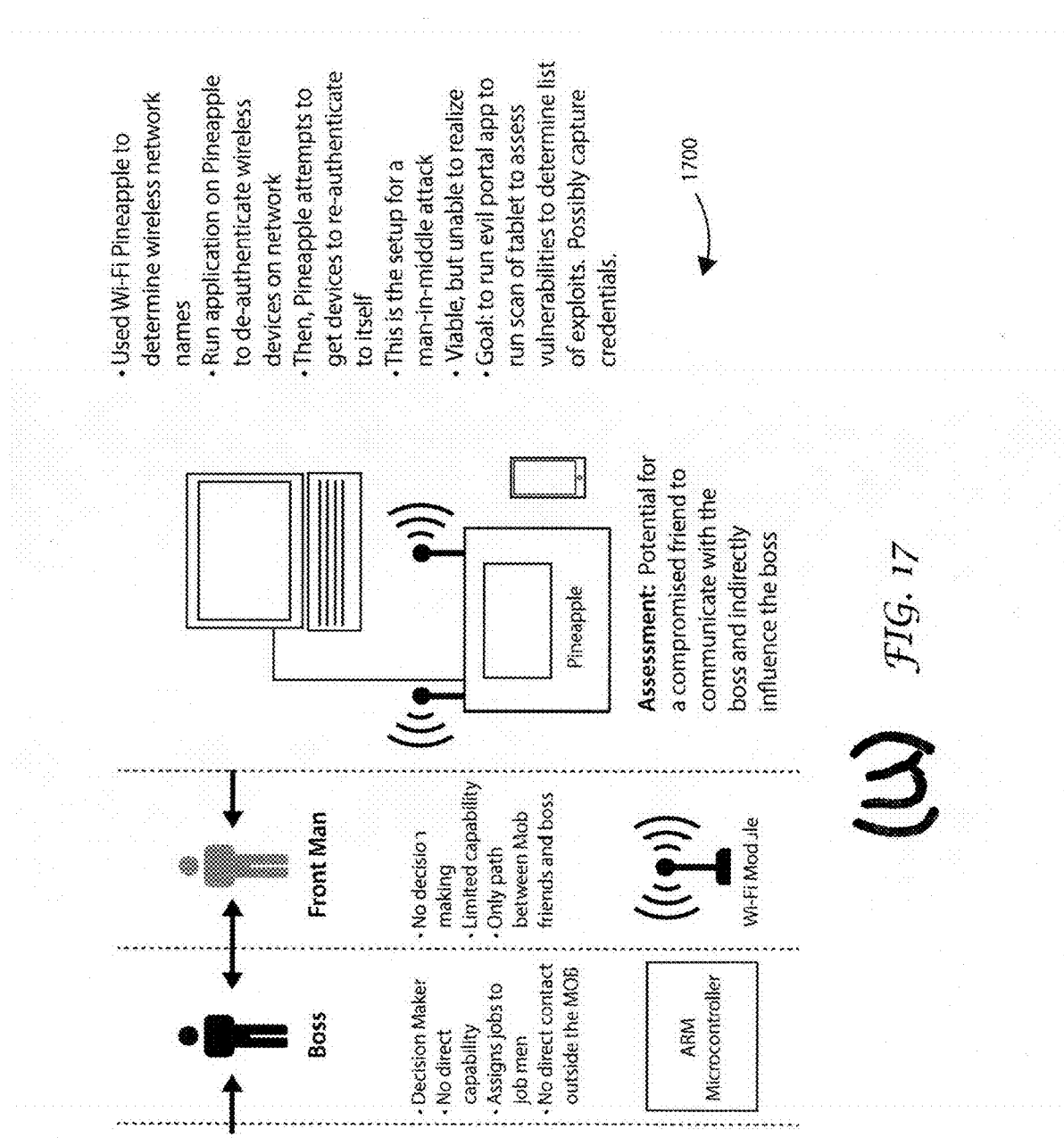
FIG. 17 illustrates third cyber-analysis of some embodiments of the invention.

Based on the test methodology described in FIG. 17 and depicted using reference character 1700, it would be possible for a Friend (tablet computer) to be compromised by an attacker. This Friend could then be used as a compromised "host" by which an attacker could attempt to gain greater access to the Front Man. However, even with legitimate access to the Front Man through a compromised Friend, the attacker is still limited to the message set that is programmed into the read-only memory of the Front Man's microcontroller. The hacker still does not have any direct access to the Boss. The only hope of an exploit is to find a weakness in the message set that can be routed through the Front Man to the Boss. The analysis of this message set will be completed and documented in later versions of this report.

Fourth Test—Physical Interface Exploitation: What external interfaces should be removed before the MOB Hub is deployed as a tactical system?

Although the MOB Hub may be designed to significantly limit attacks from a remote perspective, physical interfaces to the system must be limited in order to ensure a tamper-proof system.

Fifth Test—Network Sniffing and Message Set Exploitation

The only way to access embedded systems on the aircraft 1553 data bus via the MOB Hub is through the Job Men. The Job Men microcontrollers are programmed with read-only memory. They have no OS or file system. They maintain a list of messages that they can process and act upon. The Boss (capable processor) also contains this same message set. These messages are transmitted and received via unencrypted text from the Boss to the switch chip which then routes the message(s) to one or more of the Job Men. If an attacker had physical access to the MOB Hub for an extended period of time, it is conceivable that the attacker could reverse engineer the network traffic and derive the message set protocols. Reference character 1800 on FIG. 18 shows how physical access to the unencrypted messages between the Boss and Job Men might be collected for message protocol deconstruction.

Figure 18:
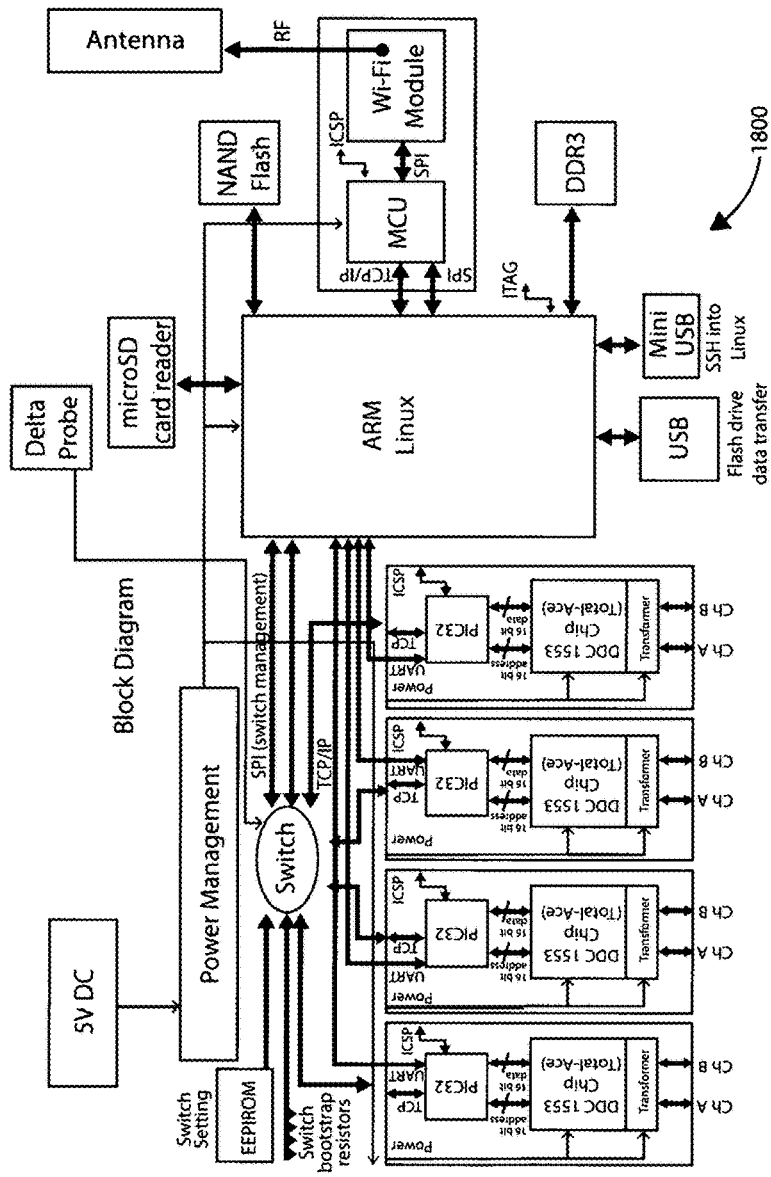
FIG. 18 illustrates a network sniffing and message protocol deconstruction of some embodiments of the invention.

The Delta probe shown in FIG. 18 has compressible wedge conductors that insert tightly between the network switch, IC pins. Each wedge contains two conductors that allows for redundant electrical contact to each IC pin. The Delta probe is ideal for monitoring traffic on the switch as well as enabling in circuit programming which could alter the behavior of the switch. The Delta probe is compatible with Agilent and Tektronix Logic Analyzers.

If the message set was understood by an attacker, in theory, it is possible that an exploit could be constructed and then placed into the message payload of a valid message to be executed by the target (i.e. an embedded system on the 1553 bus) once the message is brokered through each interface of the MOB Hub. However, for this to be a realizable exploit in a tactical setting, one or more MOB Hub interfaces would have to already be compromised by the attacker.

It is purely speculation, but it may be possible to embed an exploit into the switch itself. However, given the fact that physical access would be required, and the switch is an embedded IC with very limited capability, it is highly unlikely. Nonetheless, further research may be needed to document the attack surface of the switch IC.

From a remote perspective, the only point to enter the MOB Hub is through the Front Man. For classified wireless transmissions the Front Man maintains an encrypted link with each Friend (tablet computer). An attacker would have to somehow break the encryption and reverse engineer the message set protocols in order to determine if the message set had any weaknesses that could be exploited. Given the relative strength of an NSA Type 1 Suite B encryption used on the wireless link, this would be an unrealizable attack vector.

In summary, network sniffing and message protocol reverse engineering only has application from a physical access perspective. Assuming the breakdown of physical security, the ability to develop a useable exploit is still highly unlikely if the message set is carefully constructed and limited to only allow necessary communications. Even if an exploit could be devised, other interfaces of the MOB architecture would have to be compromised before the threat vector could be employed.

MOB Hub Cyber Enhancements

In its fundamental architecture design, the MOB Hub network of limited and capable processors does not specifically address additional elements of cyber security that may ultimately be required before the MOB Hub cab be deployed as a tactical system. These elements include: secure booting of the processors, proving that firmware/software has not been modified, authenticating and validating daughter cards added to the motherboard, and establishing a chain of trust in relation to the components used to build the MOB Hub.

The second prototype version of the MOB Hub is currently being upgraded to address the cyber security concerns noted above. The following sections outline the specific cyber security features that are being added to the MOB Hub.

Trusted Platform Module

The process of using a Trusted Platform Module (TPM) is commonly referred to as "Trusted" boot. TPM is an international standard for a secure cryptoprocessor, which is a dedicated microprocessor designed to secure hardware by integrating cryptographic keys into devices. TPM's technical specification was written by a computer industry consortium called Trusted Computing Group (TCG).

Much like a smart card, the TPM contains cryptographic primitives, but is physically bound to the platform. Meaning, a tamper hardened packaging contains low-level functional units for asymmetric key cryptography, key generation, cryptographic hashing and random number generation. Of primary interest to the MOB Hub is the feature of TPM that protects the device from unauthorized firmware and software modification by hashing critical sections of firmware and software before they are executed. Specifically, the state of a system can be evaluated with the help of the Platform Configuration Registers (PCRs), using the extend operation. This means that a TPM receives measurements x from system software and hashes the input to the PCR with index i and content $PCR_i^t$ with the operation $PCR_i^{t+1}$=SHA-1 ($PCR_i^t$∥x). The goal of adding this capability to the MOB Hub is to ensure that the system boots into a defined and trusted configuration or what is called a "secure boot."

Another feature of a TPM is remote attestation. This means the presentation of verifiable evidence about a machine to a remote party. The goal of attestation is to prove to a remote party that your operating system and application software are intact and trustworthy. The verifier trusts that attestation data is accurate because it is signed by a TPM whose key is certified by the certification authority (CA), the entity that issues digital certificates.

Ultimately, the goal is to implement mutual remote attestation which will provide both ends of the communication link a way to verify that the other party does not have a compromised OS or compromised software/firmware. This means that the MOB Hub can require the tablet to verify its OS and software configurations, and vice versa.

Figure 19:
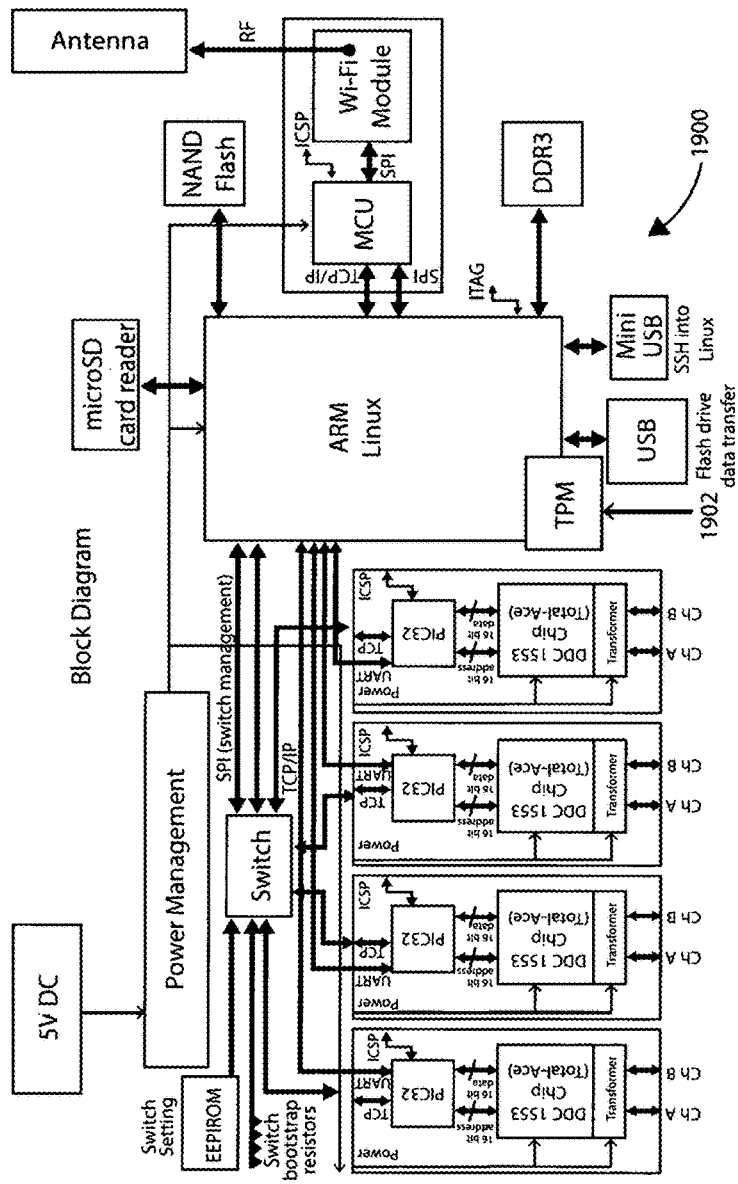
FIG. 19 illustrates a trusted platform integration into some embodiments of the invention.

FIG. 19 illustrates, using reference character 1900, TPM integration into the MOB Hub architecture. Reference character 1902 is used to generically depict the TPM integration. As a possible TPM candidate, the Atmel AT97SC3205T is a fully integrated security module designed to be integrated into embedded systems. It implements version 1.2 of the TCG specification for TPM.

Daughter Card Authentication and Validation

The purpose of high security authentication devices is to provide anti-clone protection for accessories, daughter cards, and consumables. Specifically, authentication and validation devices can provide the MOB Hub motherboard (Boss) with a means to validate that any removable or replaceable daughter card (i.e. Job Men and Front Man) is authentic.

Figure 20:
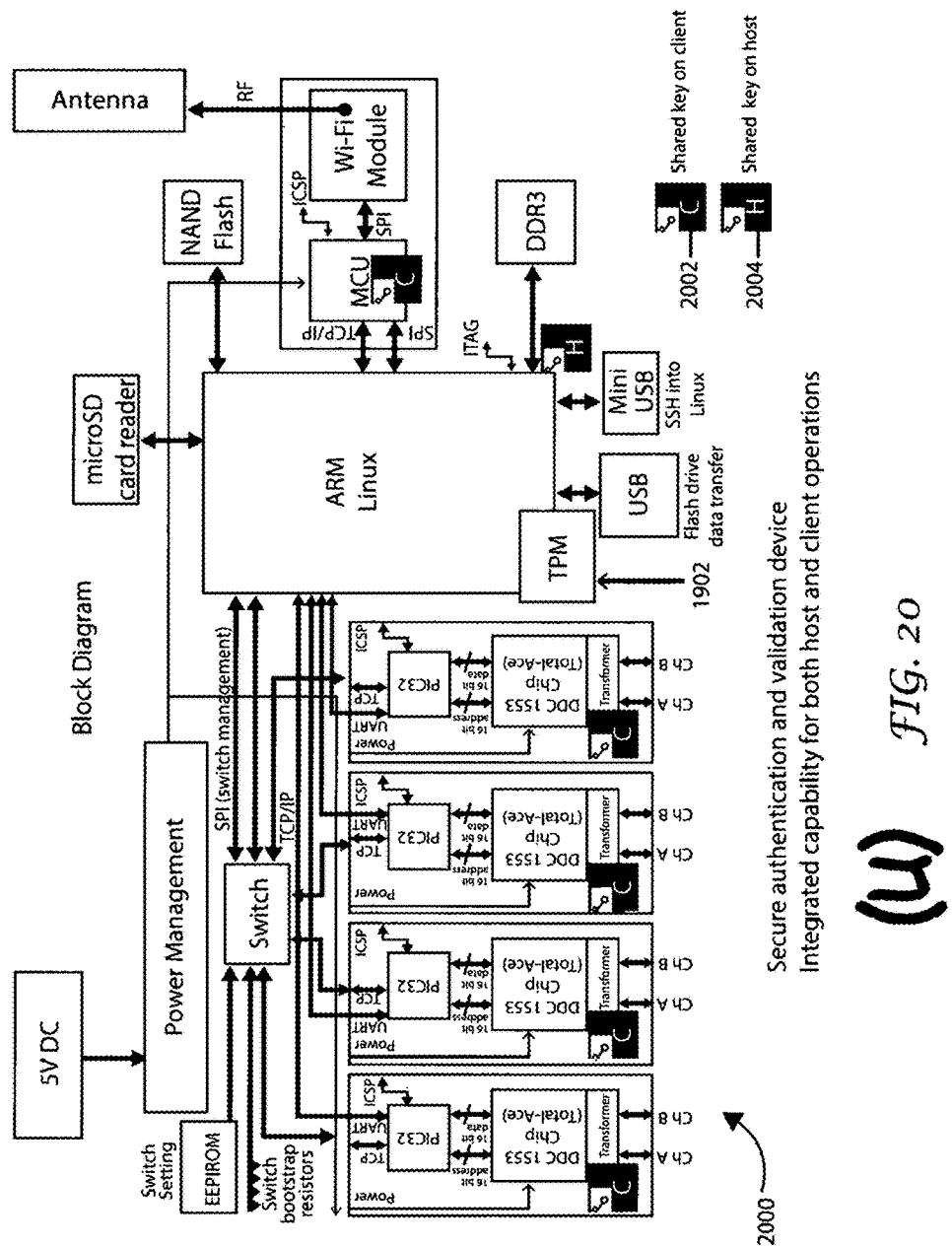
FIG. 20 illustrates a shared key for secure authentication and validation of some embodiments of the invention.

FIG. 20 illustrates the basic concept, using reference character 2000, of how the authentication and validation devices would be integrated into the MOB hub circuit board layout. A candidate device to perform this authentication and validation of daughter cards is the Atmel ATSHA204. The ATSHA204 supports a standard challenge-response protocol that would be sufficient for the MOB Hub network. FIG. 20 uses reference character 2002 to depict a shared key on the clients (daughter cards) and reference character 2004 to depict a shared key on the host (the Boss). At its most basic, the Host system 2004 (Boss) sends a challenge to the device in the Client 2002 (daughter cards), which combines that challenge with a secret key via the Message Authentication Code (MAC) command from the Host system 2004 and sends the response back to the Host system. The device uses a cryptographic hash algorithm for the combination, which prevents an observer on the bus from deriving the value of the secret key, but allows the recipient to verify that the response is correct by performing the same calculation (combining the challenge with the secret) with a stored copy of the secret key.

Figure 21:
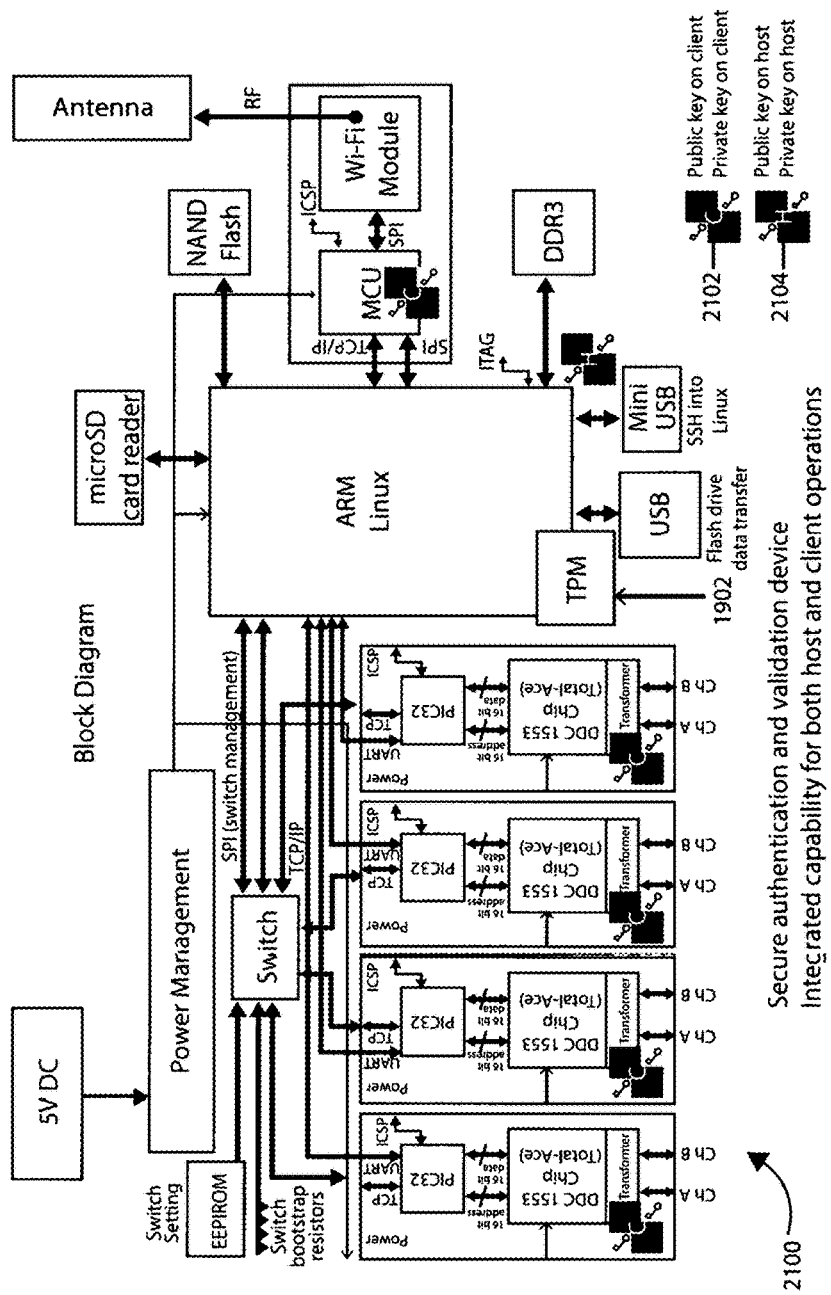
FIG. 21 illustrates a public key algorithm devices integration for secure authentication and validation of some embodiments of the invention.

FIG. 21 shows an alternative method to provide authentication and validation of daughter cards by using a Public Key Algorithm and its integration with the MOB Hub. Reference character 2102 is directed to the client (the daughter cards). Specifically, reference character 2102 depicts both a public key on the client and a private key on the client. Similarly, reference character 2104 is directed to the host (the Boss). Reference character 2104 depicts both a public key on the host and a private key on the host. A candidate device for this implementation would be the Atmel ATECC108. The ATECC108 implements a complete asymmetric (public/private) key cryptographic signature solution based on Elliptic Curve Cryptography (ECC) and the Elliptic Curve Digital Signature Algorithm (ECDSA) signature protocol. The device is designed to be able to securely store multiple private keys along with their public keys and the signature components of the corresponding certificates. The signature verification command can use any stored or external ECC public key.

Random private key generation is supported internally within the device to ensure that the private key can never be known outside the device. The public key corresponding to a stored private key is always returned when the key is generated and may optionally be computed at a later time. A notable benefit of the PKI approach is that if a key is compromised on a daughter card, the host (Boss) is not compromised.

Security Chain of Trust

In embedded systems security, a chain of trust is established by validating each component of hardware and software from the bottom up. It is intended to ensure that only trusted software and hardware can be used while still retaining flexibility. This includes the issue of supply chain which is often overlooked.

Figure 22:
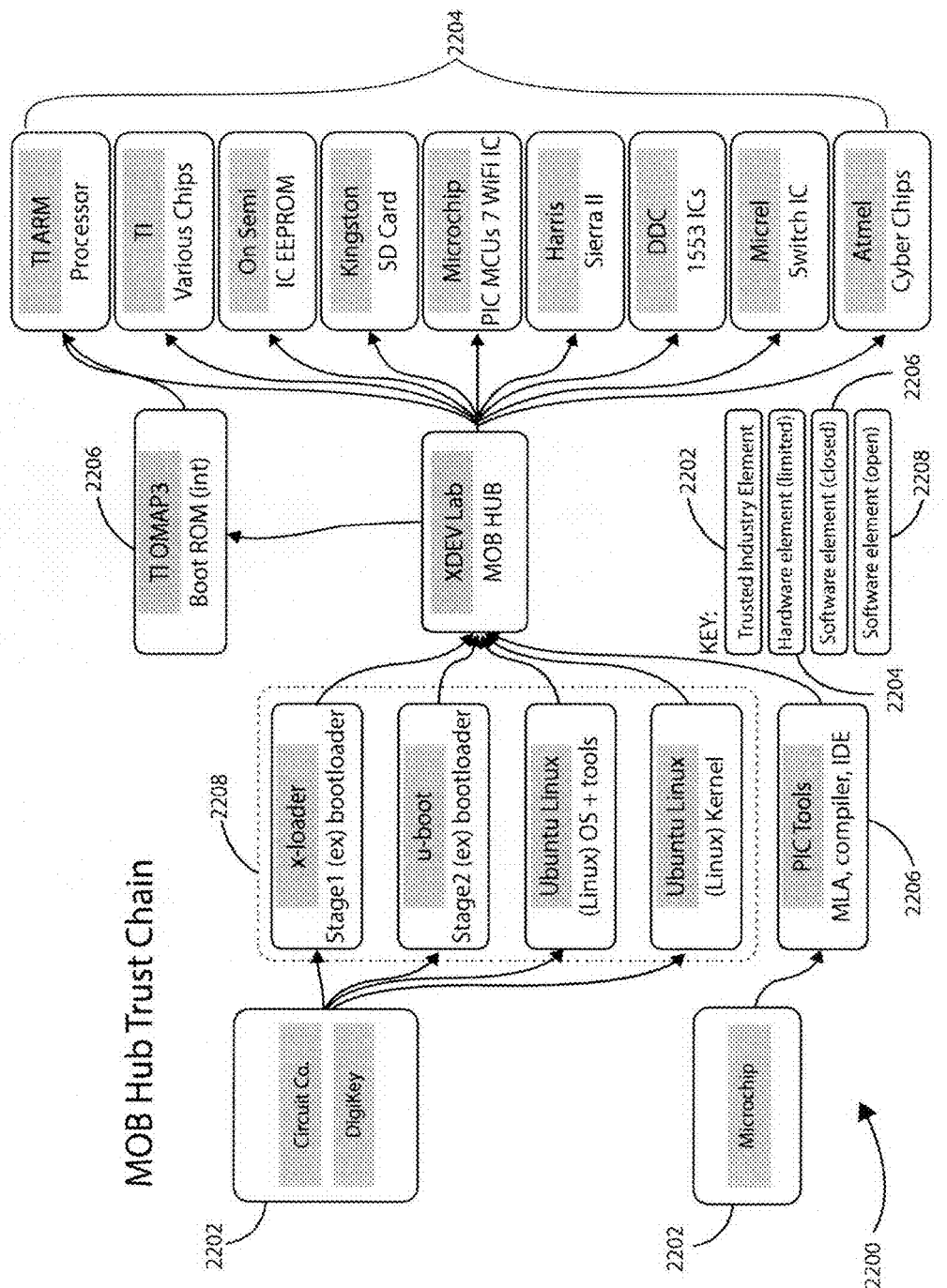
FIG. 22 illustrates a security chain of trust, according to some embodiments of the invention.

The MOB Hub has been developed with hardware components, operating systems, and software tools from various sectors of industry. In order to build an accurate security chain of trust, each of these elements must be evaluated. FIG. 22 offers a high level look at some of the main elements in the MOB Hub Trust Chain 2200.

The key elements are shown in FIG. 22. Reference character 2202 depicts trusted industry elements. Third-party distributors of hardware iomponents are not shown in FIG. 22. Also, notably missing are the third-party industry groups that support the manufacturing of the hardware items that are utilized in the MOB Hub architecture.

Hardware elements (reference character 2204) are listed as limited because datasheets are readily available to describe the hardware interfaces and functions. However, it is impossible to verify all claims made by the manufacturer regarding the hardware products because real visibility into the hardware is limited. Trust must reside at the manufacturer.

The software elements are listed as either being open (reference character 2208) or closed (reference character 2206). This designation indicates software and/or software development tools that are open for code review or more difficult to verify by the end user.

Further Research

The following list provides some further tests and methods of security to be explored relating to the cyber security of the MOB Hub:

Develop penetration testing for denial of service: By using a spoofed IP address and repeatedly sending purposely assembled synchronization (SYN) packets, followed by many acknowledgment (ACK) packets, attackers can cause the server to consume large amounts of resources keeping track of the bogus connections. This is known as a SYN flood attack.

Develop penetration testing for connection hijacking: An attacker who is able to eavesdrop a TCP session and redirect packets can hijack a TCP connection. To do so, the attacker learns the sequence number from the ongoing communication and forges a false segment that looks like the next segment in the stream. Such a simple hijack can result in one packet being erroneously accepted at one end. When the receiving host acknowledges the extra segment to the other side of the connection, synchronization is lost. Hijacking might be combined with ARP or routing attacks that allow taking control of the packet flow, so as to get permanent control of the hijacked TCP connection.

Develop penetration testing for TCP veto: An attacker who can eavesdrop and predict the size of the next packet to be sent can cause the receiver to accept a malicious payload without disrupting the existing connection. The attacker injects a malicious packet with the sequence number and a payload size of the next expected packet. When the legitimate packet is ultimately received, it is found to have the same sequence number and length as a packet already received and is silently dropped as a normal duplicate packet—the legitimate packet is "vetoed" by the malicious packet. Unlike in connection hijacking, the connection is never desynchronized and communication continues as normal after the malicious payload is accepted. TCP veto gives the attacker less control over the communication, but makes the attack particularly resistant to detection. The large increase in network traffic from the ACK storm is avoided. The only evidence to the receiver that something is amiss is a single duplicate packet, a normal occurrence in an IP network. The sender of the vetoed packet never sees any evidence of an attack.

Complete a code review for all open software and tools utilized in the development of the MOB Hub.

If possible, build Linux kernel and Linux OS from source.

Explore the concept of fully countering trusting trust through Diverse Double-Compiling (DCC): A trusting trust attack is when a compiler is subverted to insert malicious Trojan horses into critical software, including themselves. If this attack goes undetected, even complete analysis of a system's source code will not find the malicious code that is running, and methods for detecting this particular attack are not widely known. DDC is a practical technique that detects this attack and some unintended compiler defects as well. The DDC method involves simply recompiling the purported source code twice: once with a second (trusted) compiler, and again using the result of the first compilation. If the result is bit-for-bit identical with the untrusted binary, then the source code accurately represents the binary.

Explore concept of using public/private keys (asymmetric keys) to encrypt the symmetric keys that will be used to encrypt and decrypt the data between the tablet and Front Man (this is in addition to the wireless encryption). This is based on the HTTPS model but with an added feature of using the device ID with the private key to generate different public keys for each device in order to have non-repudiation before sending the symmetric keys.

Based on the information presented, a person having ordinary skill in the art will recognize that the underlying technological concepts of using the MOB Architecture as a mechanism to isolate vulnerable, embedded systems and yet still allow specific message sets to be communicated, is technically valid.

An acronym list is provided for ease of reference:
ACK Acknowledgment packet
AP Access Point
ARM Advanced RISC Machines
BC Bus Controller
C Celsius
CA Certification Authority
CCI Controlled Cryptographic Item
CIA Confidentiality Integrity Authenticity
Con Ops Concept of Operations
CPU Central Processing Unit
DoD Department of Defense
DPSS Digital Precision Strike Suite
ECC Elliptic Curve Cryptography
ECDSA Elliptic Curve Digital Signature Algorithm
HDMI High-Definition Multimedia Interface
HLOS High Level Operating System
HTTPS HyperText Transport Protocol Secure
HUD Heads-up Display
IA Information Assurance
IC Integrated Circuit
ICSP In-Circuit Serial Programming
ID Identification
IEEE Institute of Electrical and Electronics Engineers
IP Internet Protocol
IT Information Technology
JTAG Joint Test Action Group
KILSWITCH Kinetic Integrated Low-cost SoftWare Integrated Tactical Combat Handheld
MAC Media Access Control & Message Authentication Code MB Megabyte
Mbps Megabits per second
MC Mission Computer
MCU Microcontroller
microSD micro Secure Digital
mil A unit of length equal to one thousandth ($10^{-3}$) of an inch
MOB Multilayered Obstructed Brokered
NIC Network Interface Card
NSA National Security Agency
OS Operating System
oz ounce (unit of mass)
PCR Platform Configuration Register
PHY Physical Layer
PKI Public Key Algorithm
RAM Random Access Memory
RF Radio Frequency
ROM Read-only Memory
RT Remote Terminal
SPI Serial Peripheral Interface
SRAM Static Random Access Memory
SSH Secure Socket Shell
SYN Synchronization packet
TCG Trusted Computing Group
TCP Transmission Control Protocol
TPM Trusted Platform Module
UDP User Datagram Protocol
USB Universal Serial Bus
V Volts
VDC Voltage of Direct Current
VM Virtual Machine
WEP Wired Equivalent Privacy
WLAN Wireless Local Area Network
XDEV Exploratory Development Lab While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A system comprising:
a multilayered obstructed brokered network routing and data repackaging system (MOB HUB) configured to provide cryptographically secure communications between a mission computer on a vehicle and one or more embedded vehicle control systems and/or one or more mobile computers, the MOB HUB further comprising:
a multilayered obstructed brokered (MOB) embedded cyber security architecture (MOB Architecture), the MOB and MOB Architecture, further comprising:
one or more external interface hardware processors with limited access to resources as compared to a master controller hardware processor, these external interface hardware processors located physically and electrically between the master controller hardware processor and external clients external to the MOB Architecture, these external clients including the one or more mobile computers, these one or more external interface hardware processors configured to provide isolation of the master controller hardware processor from the external clients and any potential attacks from the external clients in the event one or more of the external clients is compromised or becomes compromised from attack, and
one or more internal interface hardware processors with limited access to resources as compared to the master controller hardware processor, these internal interface hardware processors located physically and electrically between the master controller hardware processor and internal clients internal to the MOB Architecture, these internal clients including the one or more embedded vehicle control systems, these one or more internal interface hardware processors configured to provide isolation of the master controller hardware processor from the internal clients and any potential attacks from the internal clients in the event one or more of the internal clients is compromised or becomes compromised from attack;
a network routing system (HUB), further comprising:
a self-contained network routing and data repackaging hardware based system that securely translates and routes between different communication protocols and communicating parties within the MOB Architecture, configured to provide a secure wireless communications interface via the external interface hardware processors in conjunction with a wireless transceiver, for secure communications between the master controller hardware processor and the external clients, the external clients including the one or more mobile computers, also configured to provide a secure wired MIL-STD-1553 communications interface via the internal interface hardware processors in conjunction with one or more wired MIL-STD-1553 buses, for secure communications between the master controller hardware processor and the internal clients, the internal clients including the various embedded vehicle control systems, and in addition configured to provide a secure wired MIL-STD-1553 communications interface for secure communications between the master controller hardware processor and the mission computer onboard the vehicle.

2. The system, according to claim 1, said MOB HUB, further comprising:
an Institute of Electrical and Electronics Engineers (IEEE) 802.11 standard compliant operations wireless data module;
wherein said master controller is an advanced reduced instruction set microprocessor (ARM) in communication with said IEEE 802.11 standard compliant operations wireless data module, said ARM running a high level operating system (HLOS); and
at least one MIL-STD-1553 communication bus interface chip configured as a bus monitor by said ARM;
wherein said IEEE 802.11 standard compliant operations wireless data module is a microcontroller (MCU) integrated with a wireless radio in communication with said MCU and said at least one mobile computer;
wherein said at least one mobile computer is configured to communicate with said IEEE 802.11 standard compliant operations wireless data module.

3. The system according to claim 2, said MOB HUB, further comprising:
a micro secure digital (microSD) card reader port, wherein said microSD card reader port is configured to read a non-volatile memory card;
a NAND flash drive port connected to said ARM;
a universal serial bus (USB) flash drive port connected to said ARM;

a mini-USB port connected to said ARM, said mini-USB port configured for a secure socket shell (SSH) into said high level operating system (HLOS);

a switch electrically-connected between said ARM and said at least one MIL-STD-1553 communication bus chip;

wherein said at least one MIL-STD-1553 communication bus chip is configured with a dedicated MIL-STD-1553 communication microcontroller having read-only memory, wherein said at least one MIL-STD-1553 communication microcontroller executes an instruction set permanently programmed into said communication microcontroller's read-only memory;

a 5 V DC power source electrically-connected with said MCU, said ARM, and said at least one MIL-STD-1553 communication bus chip;

an electrically erasable programmable read-only memory (EEPROM) in electrical communication with said switch; and a double data rate type 3 synchronous dynamic random access memory (DDR3 SDRAM) electrically connected with said ARM.

4. The system according to claim 2, wherein said wireless radio is a wi-fi transceiver.

5. The system according to claim 1, wherein said at least one mobile computer is at least one computer tablet having a graphics user interface (GUI).

6. The system according to claim 1, wherein said at least one mobile computer is a secure handheld network access device (HNAD).

7. The system according to claim 1, wherein said vehicle is selected from the group of vehicles consisting of an fixed-wing aircraft, rotary-wing aircraft, land vehicles, sea-based vessels, and littoral zone vehicles.

8. The system according to claim 1, wherein said at least one MIL-STD-1553 communication bus interface chip is four MIL-STD-1553 communication bus interface chips.

* * * * *